(12) United States Patent
Duby

(10) Patent No.: US 8,287,741 B2
(45) Date of Patent: *Oct. 16, 2012

(54) FILTER PLATE ASSEMBLY FOR FILTER

(76) Inventor: Sean R. Duby, Corona Del Mar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,699

(22) Filed: Aug. 15, 2011

(65) Prior Publication Data
US 2011/0297625 A1 Dec. 8, 2011

Related U.S. Application Data

(60) Continuation of application No. 12/534,459, filed on Aug. 3, 2009, now Pat. No. 7,998,354, which is a continuation of application No. 12/168,722, filed on Jul. 7, 2008, now Pat. No. 7,569,151, which is a division of application No. 11/027,203, filed on Dec. 30, 2004, now Pat. No. 7,396,472.

(60) Provisional application No. 60/551,442, filed on Mar. 9, 2004.

(51) Int. Cl.
| | |
|---|---|
| B01D 29/13 | (2006.01) |
| B01D 29/64 | (2006.01) |
| B01D 29/66 | (2006.01) |
| B01D 25/12 | (2006.01) |

(52) U.S. Cl. ........ 210/770; 210/224; 210/225; 210/230; 210/231; 210/332

(58) Field of Classification Search .................. 210/770, 210/791, 224–225, 230–231, 332–342
See application file for complete search history.

(56) References Cited

U.S. PATENT DOCUMENTS

| | | | |
|---|---|---|---|
| 1,302,813 A | 5/1919 | Kuryla | |
| 2,933,190 A | 12/1954 | Peterson | |
| 3,098,429 A | 7/1963 | Hagglund | |
| 3,270,887 A | 9/1966 | Juhasz et al. | |
| 3,306,445 A | 2/1967 | Moziek | |
| 3,342,123 A | 9/1967 | Ermakov et al. | |
| 3,583,566 A | 6/1971 | Meshengisser et al. | |
| 3,620,233 A | 11/1971 | Busse et al. | |
| 4,032,450 A | 6/1977 | Iwatani | |

(Continued)

FOREIGN PATENT DOCUMENTS
FR 1 433 031 A 3/1966

OTHER PUBLICATIONS
European Search Report; Application No. EP 05 72 4484.

*Primary Examiner* — Duane Smith
*Assistant Examiner* — Ives Wu
(74) *Attorney, Agent, or Firm* — Knobbe, Martens, Olson & Bear, LLP

(57) ABSTRACT

A filter configured to separate the solid components and the liquid components from a slurry. The filter includes a plurality of filter plate assemblies that cooperate to define a plurality of filter chambers, each defining a perimeter having an open section when the filter plates are in a closed position relative to one another. Each filter plate assembly includes a closure configured to close the open section. Preferably, the closures are movable to an open position to permit a particulate cake to be removed from the filter chambers without separating the filter plates.

19 Claims, 20 Drawing Sheets

U.S. PATENT DOCUMENTS

| | | |
|---|---|---|
| 4,129,137 A | 12/1978 | Kurita et al. |
| 4,172,792 A | 10/1979 | Heinrich et al. |
| 4,325,396 A | 4/1982 | Gehrmann |
| 4,999,118 A | 3/1991 | Beltchev |
| 5,160,428 A | 11/1992 | Kuri |
| 5,198,123 A | 3/1993 | Stover et al. |
| 5,246,578 A | 9/1993 | Spiegel et al. |
| 5,558,773 A | 9/1996 | Aigeldinger et al. |
| 6,387,282 B1 | 5/2002 | Heckl et al. |
| 6,613,226 B2 | 9/2003 | Kuo |
| 6,833,071 B2 | 12/2004 | Duby |
| 7,396,472 B2 * | 7/2008 | Duby .......... 210/770 |
| 7,569,151 B2 * | 8/2009 | Duby .......... 210/770 |
| 7,998,354 B2 * | 8/2011 | Duby .......... 210/770 |
| 2006/0131224 A1 | 6/2006 | Hibble |
| 2009/0211990 A1 | 8/2009 | Duby |

* cited by examiner

FILTER PLATE ASSEMBLY FOR FILTER

RELATED APPLICATIONS

Related applications are listed in an Application Data Sheet (ADS) accompanying this application. The entirety of each related application listed on the ADS is expressly incorporated by reference herein.

BACKGROUND

1. Field of the Invention

The present invention is related generally to the field of separating solid and liquid components from a mixture. More specifically, the present invention is related to an improved filter plate assembly and related methods and filtering devices.

2. Description of the Related Art

Separating the liquid and solid components of a liquid-solid mixture, or slurry, is a necessary or desirable process in many industries. In many filtering applications, the slurry is a waste product and it is desirable to separate the solid and liquid matter and dispose of them separately. Often, the solid component may be a hazardous material and the liquid component may be reused or recycled. In other applications, the liquid component may be the final product, such as in the juice industry, for example. In this application, the solid component is desirably separated from the liquid to provide purity and clarity to the juice.

One method for separating liquids and solids is known as surface filtering. In a surface filtering process, the liquid-solid mixture is passed through a filter element under the influence of gravity or a relatively low pressure. The liquid component of the mixture passes through the filter element while the solid component is retained primarily on the surface of the filter element. However, with this type of filtering process, once the surface of the filter element is substantially covered with solid particulate matter, liquid is no longer able to pass through the filter element. The filter element must then be cleaned or replaced. Thus, surface filter processes are useful only for filtering slurries having a low concentration of solid matter.

Another method of filtering slurries having relatively high concentrations of solid matter uses an apparatus known as a filter press, which operates under a displacement filtering principle. A filter press utilizes a series of filter plates placed adjacent to one another. A space is defined between each pair of the filter plates and each space is lined with filter media. Typically, each of the filter plates includes a central aperture to permit all of the spaces between each pair of plates communicate with one another. An inlet is provided to introduce slurry into the interconnected spaces on an upstream side of the filter media. One or more outlets communicate with each space on a downstream side of the filter element.

Slurry is introduced through the inlet to fill all of the individual spaces between the filter plates. Once the spaces are filled, the delivery pressure of the incoming slurry is increased such that the liquid component is displaced through the filter media and the solid particulate matter is retained within the spaces upstream from the filter media. The filtered liquid, or filtrate, moves to the outlet(s), where it is discharged. The filter cycle continues until each of the spaces is substantially filled with particulate matter. Thus, the filter press utilizes substantially the entire volume of the spaces rather than relying on the surface area of the filter media, as is the case with surface filtering methods.

The solid particulate "cake" remaining in each individual space after the filter cycle must be removed in preparation for a subsequent filter cycle. The removal of the particulate cake may be accomplished manually or, in some instances, automatically. In either case, the filter plates must be separated from one another at least a distance equal to the thickness of the particulate cake to permit the particulate cake to be discharged from the filter cavity. Because as many as a hundred or more individual plates may be used, the cleaning process is very time-consuming and results in excessive down-time in which the filter press is not utilized. In addition, the filter press must be substantially longer than a length of the filter plates in order to provide space to separate the plates. Furthermore, due to the provision of multiple plates which need to be separated, fully automated filter cleaning systems employed with conventional filter presses are complex and often prohibitively expensive.

SUMMARY OF THE INVENTION

Preferred embodiments and methods permit automatic cake discharge for a filter press in a cost-efficient manner. The preferred embodiments and methods permit particulate cake to be discharged from the filter chambers of a filter press, while the individual filter plates are maintained in a compacted, or condensed, position. That is, preferably, the cake discharge is permitted with the individual filter plates separated a distance that is less than a thickness of the particulate cake. More preferably, the individual filter plates are maintained in contact with one another during discharge of the particulate cake.

In one embodiment, a filter plate assembly includes a first filter plate and a second filter plate. The first filter plate has a first surface and the second filter plate has a second surface facing the first surface. The first and second filter plates are movable between an open position and a closed position relative to one another. When the filter plates are in the closed position, an interior portion of the first surface is spaced from an interior portion of the second surface to define therebetween a filter chamber having a perimeter. The filter plate assembly is capable of creating a seal between the first filter plate and the second filter plate, thereby defining a sealed section of the perimeter. The sealed section extends a length less than an entire length of the perimeter such that the filter plate assembly also defines an open section of the perimeter. The open section is sized and shaped to permit particulate cake to be removed from the filter chamber. The filter plate assembly also has a closure configured to be movable between a first position closing the open section and a second position not closing the open section. The closure is further capable of sealing the open section of the perimeter in the first position.

In another embodiment, a method of filtering includes forming a sealed filter chamber with a filter plate assembly. The filter plate assembly has a first filter plate, a second filter plate, and a closure. The first filter plate and the second filter plate are movable from an open position to a closed position relative to one another to partially close the filter chamber, thereby defining an open section of the filter chamber. The closure is configured to close the open section of the sealed filter chamber. A slurry is introduced into the filter chamber. A liquid of the slurry is forced through a filter media lining at least a portion of the filter chamber until a particulate cake is formed within the filter chamber, which occupies a substantial portion of the filter chamber. The closure is removed while maintaining the first filter plate and the second filter plate in the closed position and the particulate cake is discharged through the open section of the filter chamber.

In yet another embodiment, a filter press has a frame including a support surface. The filter press has a stationary head, a movable head, and a plurality of filter plates. The filter plates are supported by the support surface between the stationary head and the movable head. The plurality of filter plates is movable relative to one another along the support surface between a separated position and a condensed position. A force generator is configured to apply a force to the movable head in a direction toward the stationary head to squeeze the plurality of filter plates between the movable head and the stationary head. The adjacent pairs of the filter plates are configured to form a partially sealed filter chamber when the force generator applies a sufficient force to create a seal between the plurality of filter plates. A perimeter of the filter chamber has an open section. A closure is configured to close the open section. The closure is removable from the open section to permit particulate to be removed from the filter chambers with the plurality of filter plates in the condensed position.

BRIEF DESCRIPTION OF THE DRAWINGS

These and other features, aspects and advantages of the present filter press assembly are described with reference to drawings of the preferred embodiments. These embodiments are intended to illustrate, but not to limit, the present invention. The drawings contain eighteen figures:

FIG. 3a shows flow channels that deliver filtrate from the filter cavities to an outlet channel.

DETAILED DESCRIPTION OF THE PREFERRED EMBODIMENTS

Figure 1:
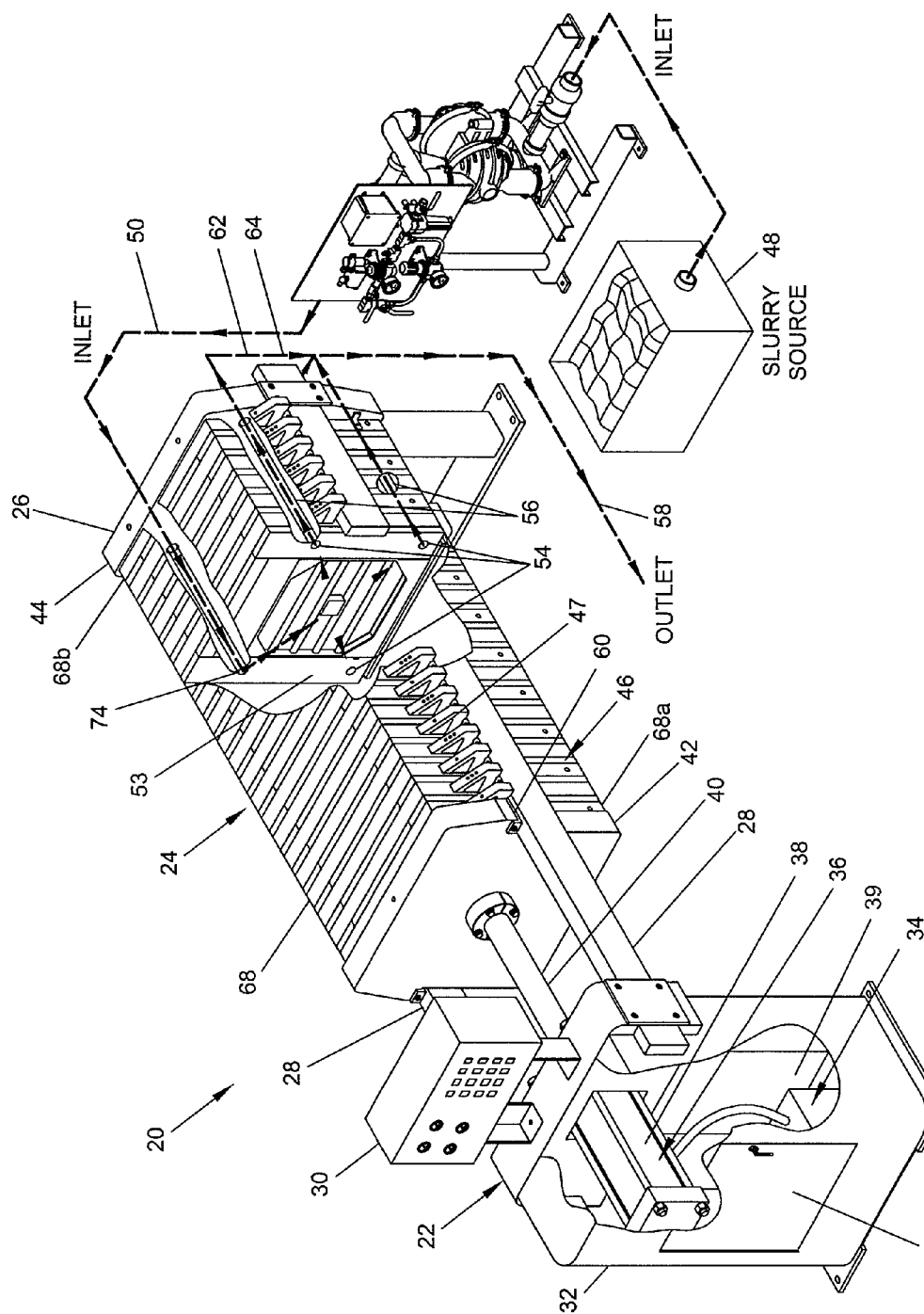
FIG. 1 is a perspective view of a filter press incorporating a plurality of filter plate assemblies having certain features, aspects, and advantages of the present invention.

A filter press is used to separate liquid and solid components from a liquid-solid mixture, such as a slurry or sludge. For example, the filter press described herein is generally referred to by the reference numeral 20 and can be used to filter a process fluid, industrial waste, municipal waste, or perform component separation in other settings. The filter press 20 may also be used in a variety of other industries.

During the filtering process, solids accumulate and form a particulate cake within filter chambers defined by the filter press 20. The filter press 20 preferably includes a mechanism for rapidly discharging the cake from the filter chamber, without requiring the filter plates to be entirely separated from one another, as is described in greater detail below. For example, in one arrangement the cake can be removed from the filter press by using a movable closure to permit access to the filter chamber. The methods and structures disclosed herein are described in the context of a filter press, but are intended for application in any of a wide variety filtering applications, as will be apparent to those of skill in the art in view of the disclosure herein. Further, those skilled in the art will recognize that many of the following disclosed embodiments, or portions thereof, may be modified and/or combined with one another to form further embodiments, and that no single feature is essential to the operation of the filter press. Thus, certain features and aspects of the filter press assemblies described below may also be used with a variety of other filtration devices.

FIG. 1 illustrates a filter press 20 that is configured to separate solid and liquid components of a sludge or slurry. Preferably, the filter press 20 includes an end stand 22, a collection of filter plates 24, and a head stand 26. The collection of filter plates 24 are positioned between the end stand 22 and the head stand 26. A pair of rails 28 extend between the end stand 22 and the head stand 26 and, preferably, support the collection of filter plates 24. In the illustrated arrangement, each filter plate of the collection of filter plates 24 may be separated from the other filter plates, if desired, to permit removal or replacement of one or more of the individual filter plates or to provide access to the filter media. Alternatively, however, the filter plates may be connected together and may be configured to either permit or inhibit relative movement between the filter plates, as desired. In one arrangement, a portion or all of the collection of filter plates may be made up of a single, monolithic piece of material.

Generally, the filter press 20 passes a slurry through the filter cavities of the collection of filter plates 24, which utilize a filter media to retain the solid component of the slurry and permit the liquid component, or filtrate, to exit the collection of filter plates 24. The collected solid component accumulates to form a cake of particulate material within each of the filter cavities. At the end of a filter cycle, the cake can be removed from the collection of filter plates 24 so that a subsequent filter cycle can be performed.

The end stand 22 preferably includes a controller 30, a housing 32, and a force generator, such as a hydraulic force unit 34. The hydraulic force unit 34 preferably is configured to apply a squeezing force to the collection of filter plates 24 of a sufficient level to create a seal between each filter plate of the collection of filter plates 24. The end stand 22 also supports one end of the pair of rails 28 and preferably houses a portion of the hydraulic force unit 34, including at least a portion of a hydraulic cylinder 36 of the hydraulic force unit 34.

Preferably, the controller 30 is configured to permit a user to control operating parameters of the filter press 20. For example, in one arrangement, the controller 30 is a numeric controller that permits adjustment of the slurry feed parameters (such as feed pressure or flow rate of the slurry) and the force exerted by the hydraulic cylinder 36 in squeezing the collection of filter plates 24. In the illustrated embodiment, the controller 30 is disposed on the top of the housing 32. However, the controller 30 can be provided in other suitable locations to provide easy access to the controller 30.

In the illustrated embodiment, the housing 32 defines an inner chamber 39 that generally houses the hydraulic force unit 34. The housing 32 preferably includes a door 41 that provides easy access to the hydraulic force unit 34. Those skilled in the art will recognize that there are various shapes and configurations of the housing 32 that would be suitable to house at least a portion of the hydraulic force unit 34. In some arrangements, the housing 32 may not be necessary or desired.

The hydraulic unit 34 is configured to pressurize the hydraulic cylinder 36 to apply a force to at least a portion of the collection of filter plates 24. In the illustrated embodiment, the hydraulic cylinder 36 has a body 38 and a shaft, or piston rod 40 that extends outward from one end of the body 38. The piston rod 40 can be moved inwardly and outwardly of the body 38 to selectively apply, or release, a squeezing force to the collection of filter plates 24.

Preferably, the exposed end of the piston rod 40 is coupled to a moveable head 42, which is supported by the pair of rails 28 on an end of the collection of filter plates 24 opposite the head stand 26. The piston rod 40 is configured to move the movable head 42 along the rails 28 to selectively apply a squeezing force to the collection of filter plates 24 against a stationary head 44, which preferably is supported by the head stand 26. Thus, the hydraulic cylinder 36 can move the movable head 42 along a longitudinal axis of the filter press 20 toward or away from the end stand 22 to selectively compress or release the collection of filter plates 24.

Preferably, the collection of filter plates 24 includes at least one filter plate assembly, generally referred to by the reference numeral 46. More preferably, the collection of filter plates 24 includes a plurality of filter plate assemblies 46 that cooperate to filter solids from a slurry. Desirably, each individual filter plate, with the exception of the end filter plates, forms a filter cavity with each adjacent filter plate. Thus, each individual filter plate of the filter plate assemblies 46, with the exception of the end plates, form a portion of two separate filter plate assemblies 46, as is described in greater detail below.

A slurry source 48 provides slurry to the filter press 20 and, more specifically, to the collection of filter plates 24, as indicated by the slurry line 50 in FIG. 1. In the illustrated embodiment, the slurry provided by the slurry source 48 passes through a supply passage 52 disposed in a corner of the collection of filter plates 24. In an alternative arrangement, the supply passage 52 may be disposed through a central portion of the collection of filter plates 24, as described below with reference to FIG. 4.

The supply passage 52 introduces slurry into each filter cavity of the collection of filter plates 24. As slurry passes through the collection of filter plates 24, an amount of slurry flows radially from the supply passage 52 to fill the filter cavities within the filter plate assemblies 46, as illustrated by the arrows 53 in FIG. 1. The slurry is filtered after it passes from the supply passage 52 by passing through filter media, which retains the solid component of the slurry and permits the liquid component of the slurry, or filtrate, to be passed into an opening 54 of one of a plurality of outlet passages 56. The filtrate flows through the outlet passage 56, which communicates with each filter cavity downstream of the filter media and passes through the head stand 26. The filtrate is discharged from an outlet 58 to be collected or used as desired.

Figure 18:
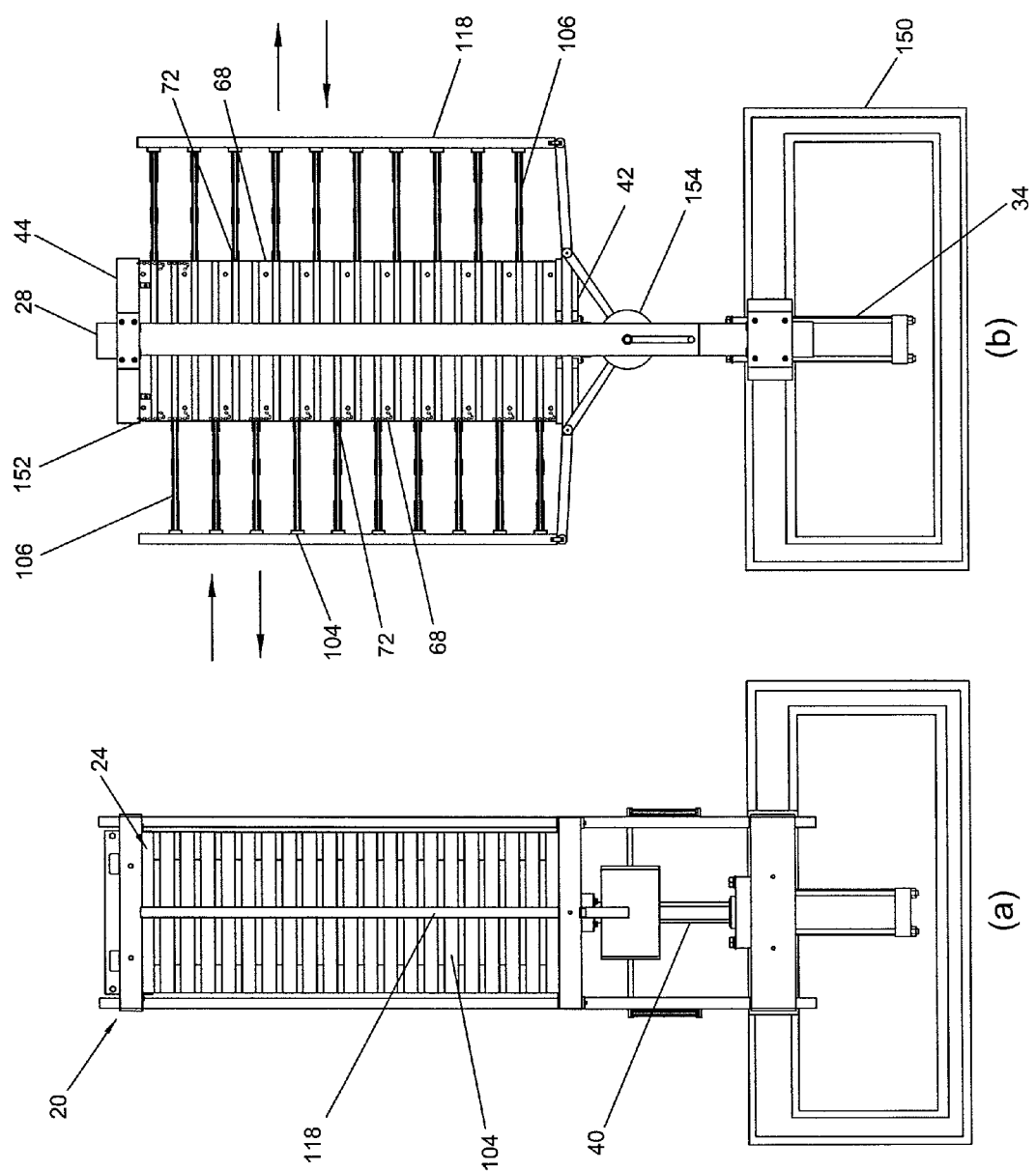
FIG. 18a is a modification of the filter press of FIG. 1. In the filter press of FIG. 18a, a longitudinal axis of the filter plate assembly is oriented in a substantially vertical manner. Preferably, in most other respects the filter press of FIG. 18a is substantially similar to the filter press of FIG. 1.
FIG. 18b shows the filter press of FIG. 18a with the closures and scrapers in an open position. Adjacent scrapers and closures are configured to be opened from opposing sides of the filter plate assembly in order to provide space for the particulate cake to be discharged.

In the illustrated embodiment, the filter plate assemblies 46 are vertically oriented plates that are movable, along a generally horizontal axis, between a closed, or condensed, position and a separated position. However, in an alternative arrangement, the filter plate assemblies 46 may be stacked vertically, as described below with reference to FIG. 18, or in any other suitable orientation. The number of filter plate assemblies 46 that form the collection of filter plates 24 can vary greatly depending on the desired capacity of the filter press 20. In general, a large number of filter plate assemblies 46 are provided for a filter press 20 that is intended to filter a substantial amount of slurry during each filter cycle, while a smaller number of filter plate assemblies 46 may be sufficient for lower volume filtering applications, or where the slurry to be filtered has a relatively low concentration of solids. Furthermore, the filter plate assemblies 46 may also vary in size to provide a desired capacity. Preferably, the filter plate assemblies 46 have height and width dimensions of about 18 inches to about 58 inches or an area of up to about 2 square meters. In other arrangements, larger filter plate assemblies 46 may be desirable.

Preferably, an upper surface of the pair of rails 28 support handles 47 that are provided on opposing sides of each filter plate of the collection of filter plates 24. The rails 28 are disposed on opposing sides of the collection of filter plates 24. Preferably, the handles 47 slidably engage the upper surface of the rails 28 such that the filter plate assemblies 46 can be moved along the rails 28 to permit the individual filter plates to be separated from one another.

The movable head 42 preferably includes skid brackets 60 that slide along the upper surface of the rails 28 to permit the movable head 42 to move along the rails 28. Thus, as described previously, the hydraulic force unit 34 is capable of moving the moveable head 42 along the pair of rails 28 to selectively compress, or release, a portion or all of the collection of filter plates 24. Alternatively, the movable head 42 may move relative to the rails 28 on wheels or rollers or by any other suitable arrangement. In one alternative arrangement, the pair of rails 28 may be replaced by a single rail, which in some instances may be located above the collection of filter plates 24. Such an arrangement is referred to as an overhead filter press.

Figure 2:
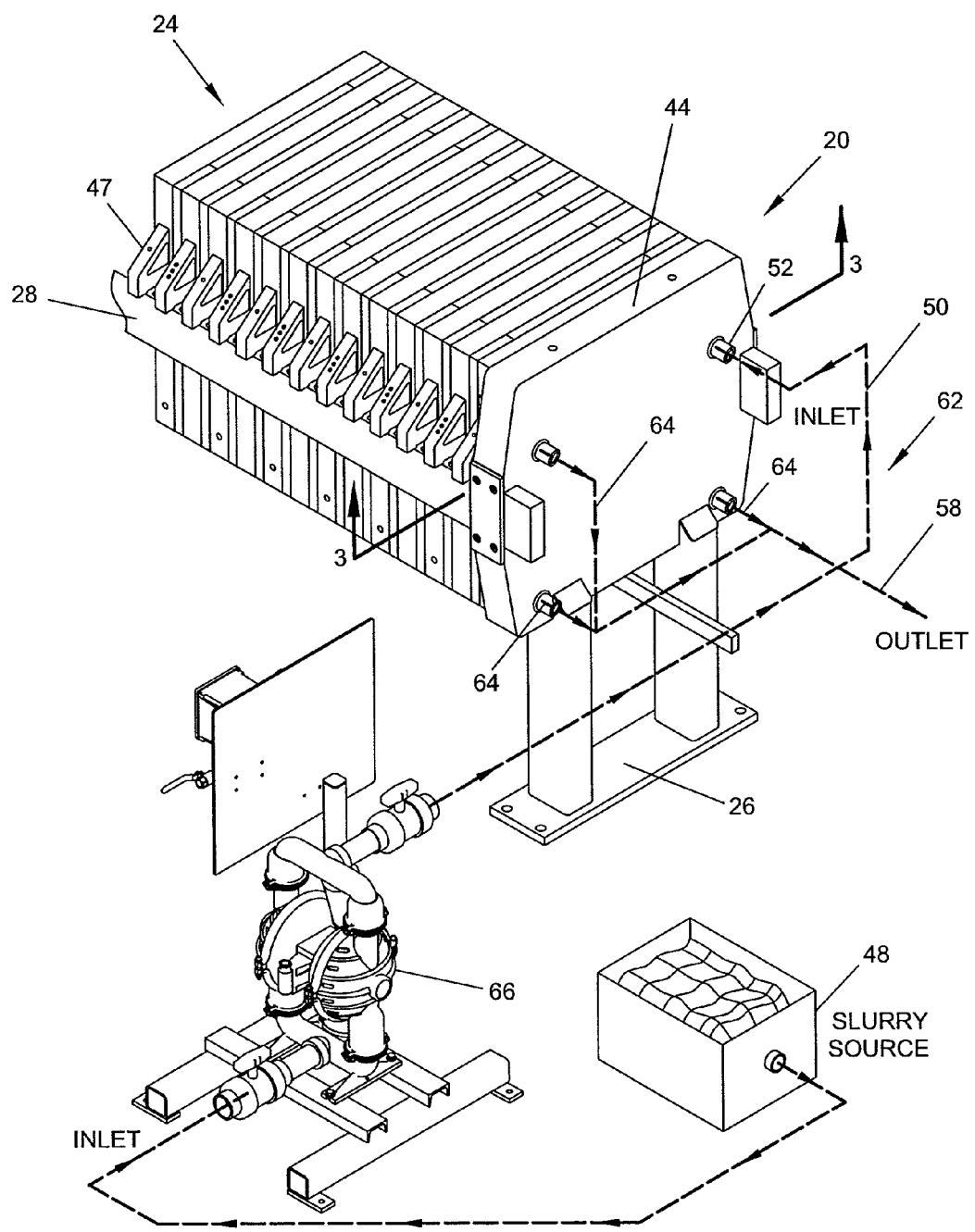
FIG. 2 is a perspective view of an end portion of the filter press of FIG. 1.
Figure 3:
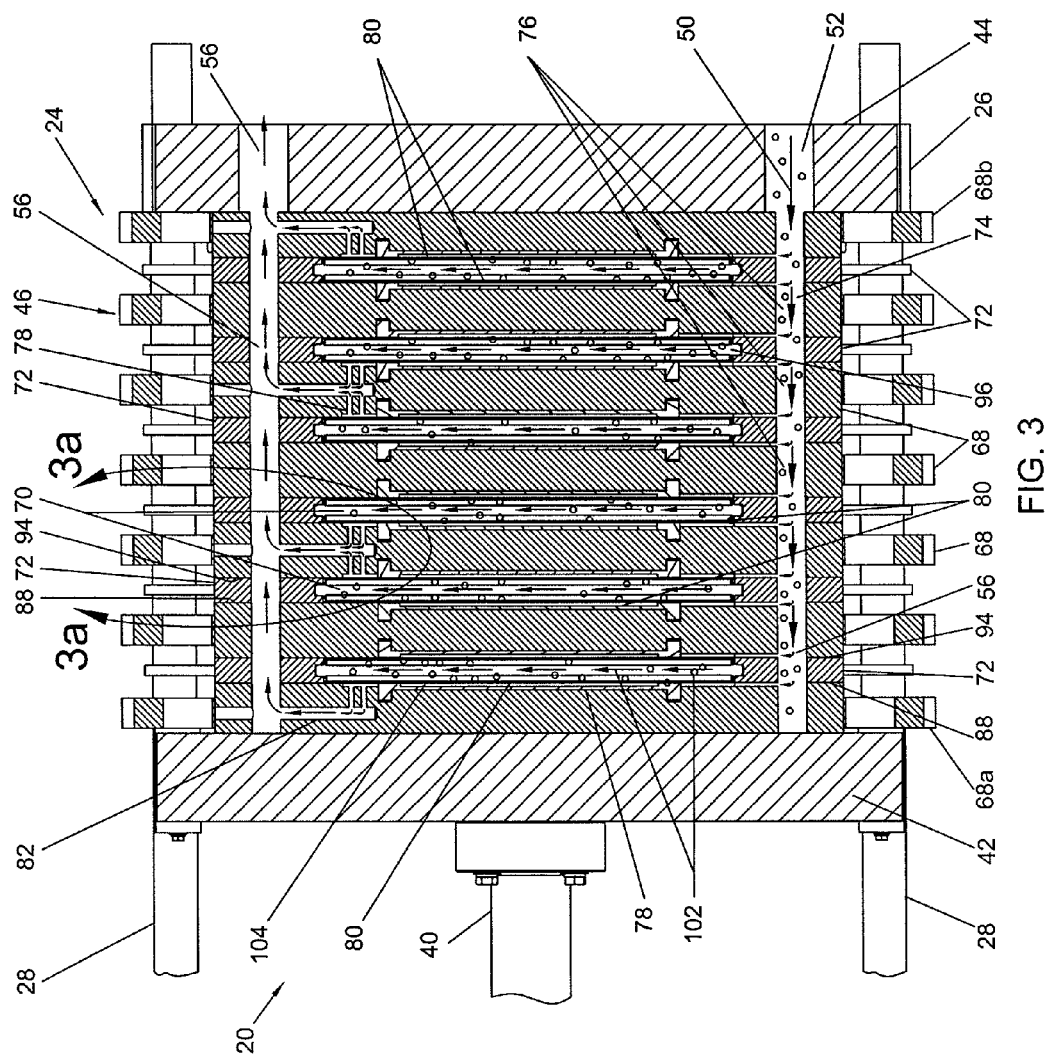
FIG. 3 is a cross section view of the filter press of FIG. 1 taken along line 3-3 of FIG. 2, illustrating the filter cavities defined by the filter plate assemblies. A scraper assembly is positioned within each of the filter cavities.

In FIGS. 1-3, the collection of filter plates 24 are illustrated in a closed position. Although not illustrated, preferably, the individual plates of the collection of filter plates 24 can be moved into an uncompressed, or open position such that at least some of the plates 46 are spaced from one another thereby exposing at least a portion of the filter cavities of the collection of filter plates 24 or permitting removal or replacement of one or more individual filter plates or provide access to the filter media. However, preferably, the collection of filter plates 24 are configured to permit particulate matter to be emptied from the filter chambers at the end of a filter cycle, without significantly separating the filter plates from one another, as is described in greater detail below. Thus, alternative arrangements are possible wherein the filter plates are not separable from one another or are assembled as an integral unit or formed as a monolithic structure. In one arrangement, the filter plates may be interconnected by a daisy-chain arrangement or a bellows-type arrangement, which permit the filter plates to be separated from one another, preferably up to a predetermined distance.

With reference to FIG. 2, preferably, the filter press 20 includes a fluid circulation system 62 configured to deliver slurry from the source 48 to the collection of filter plates 24 and deliver filtrate from the collection of filter plates 24 to the outlet 58. In the illustrated arrangement, the fluid system 62 includes the supply passage 52 along with a plurality of outlet passages 64, which communicate with the outlet passages 56, described above with reference to FIG. 1.

Preferably, the supply passage 52 extends from a slurry pump 66 through the stationary head 44 and into the filter cavities of the collection of filter plates 24. The slurry pump 66 is configured to deliver slurry from the slurry source 48 to the supply passage 52. The outlet passages 64 collect filtrate from the internal outlet passages 56 and deliver the filtrate to the outlet 58, which is configured to discharge the filtrate to an appropriate location. In some applications, the filtrate may be a desired end product and may be collected. In other applications, the filtrate may be disposed of through an appropriate mechanism, such as an industrial waste removal system, for example.

With reference to FIG. 3, the collection of filter plates 24 preferably includes a plurality of filter plate assemblies 46. In the illustrated arrangement, the collection of filter plates 24 includes a tail filter plate 68a, several intermediate filter plates 68, and a head filter plate 68b. In general, all of the filter plates may be referred to using the reference numeral 68, including the head and tail filter plates 68a, 68b. Those skilled in the art will recognize that the filter plates 68, and resulting filter chambers, can be generally rectangular, circular, or any other suitable shape when viewed along the longitudinal axis of the collection of filter plates 24.

Preferably, a pair of filter plates 68 cooperate with one another to form a filter plate assembly 46, which defines a filter chamber 70. Preferably, both the head and tail filter plates 68a, 68b are single-sided. That is, each cooperates with only one other filter plate 68 and the plates 68a, 68b are positioned at opposing ends of the intermediate filter plates 68. The intermediate filter plates 68 preferably each cooperate with each adjacent filter plate 68. Thus, the intermediate filter plates 68 each cooperate with two other filter plates 68 and form a portion of two filter plate assemblies 46.

In the illustrated embodiment, a frame 72 is interposed between each of the filter plates 68. The frame 72 spaces the filter plates 68 apart from one another to define at least a portion of the thickness of the filter chamber 70. In certain arrangements, the use of a frame 72 permits the surfaces of the filter plates 68 facing the filter chamber 70 to be planar such that the entire thickness of the filter chamber 70 is determined by the thickness of the frame 72. Such an arrangement is advantageous when a flat interior surface to the filter plates 68 is desired, such as when a paper filter media is used, for example. In other arrangements, the frame 72 may be omitted and the filter chambers 70 may be defined by recessed portions of the cooperating filter plates 68. Thus, although the illustrated filter plate assemblies 46 include both filter plates 68 and a frame 72, it is also possible to form the filter chambers 70 without the frame 72 wherein the filter plates 68 would provide the generally equivalent function of the frame 72, as will be appreciated by one of skill in the art.

Each filter plate 68 preferably includes a corner opening 74, which permits fluid communication between the filter chambers 70 on opposing sides of the filter plate 68. Together, the corner openings 74 define a central inlet passage 76 through the collection of filter plates 24 that permits fluid communication between all of the filter chambers 70. Thus, the inlet passage 76 permits slurry from the inlet passage 52 to be delivered to each filter chamber 70. In other arrangements the inlet passage 76 can be disposed in other locations within the collection of filter plates 24. For example, the passage 76 may be formed within the center of the filter plates 68. Such an embodiment is described in greater detail below with reference to FIG. 4.

Figure 3A:
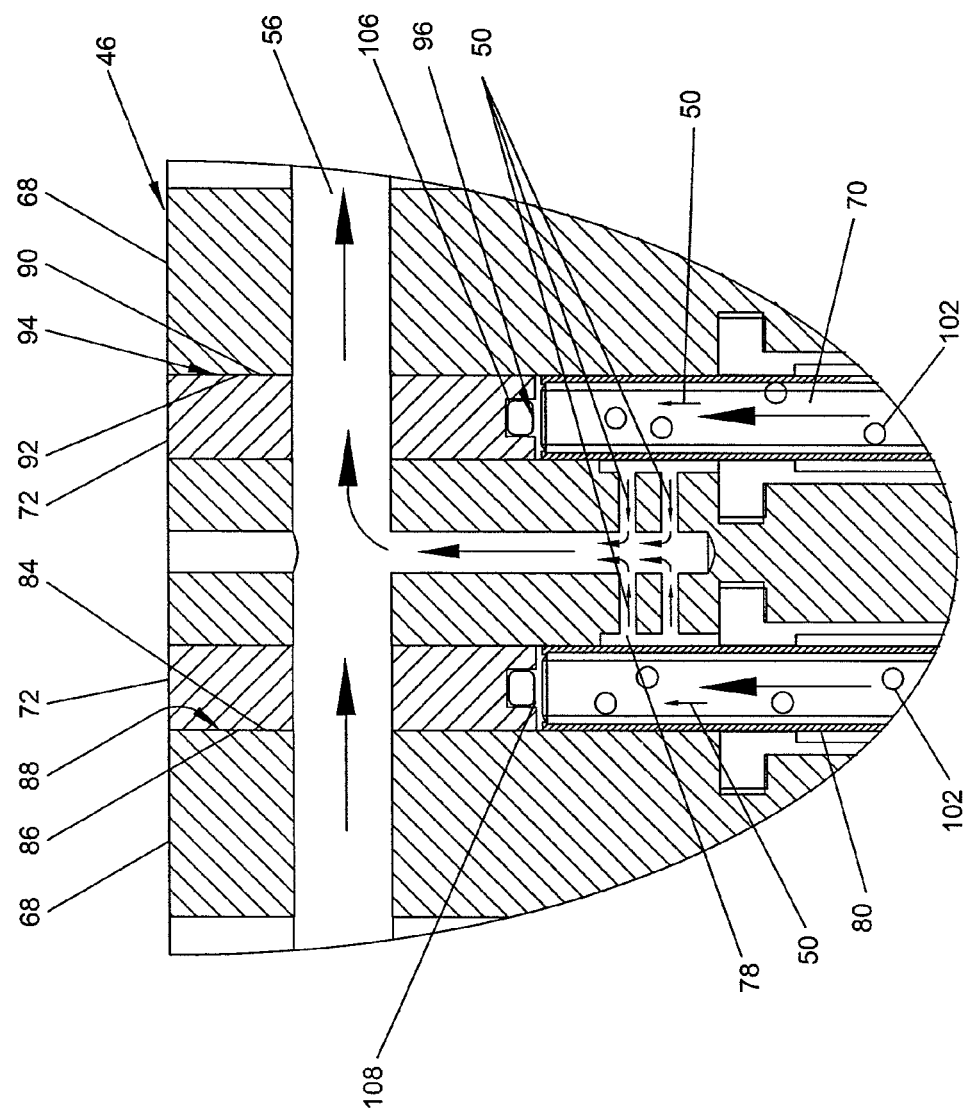
FIG. 3a is an enlarged, partial view of the filter press of FIG. 3 taken along line 3a-3a in FIG. 3.

With reference to FIGS. 3 and 3a, preferably each filter plate 68 includes a fluid passage 78 disposed on a downstream side of a filter media 80, which lines at least a portion of the filter chamber 70. The passage 78 is preferably disposed along a substantial portion of the filter media 80 and is configured to permit the liquid component of the slurry to flow to the outlet passage 56. In the illustrated arrangement, the passage 78 is a recess region in the filter plate 68 in fluid communication with a channel 82 that, in turn, is connected to the outlet passage 56. Liquid that passes through the filter media 80 is received in the passage 78 and then proceeds through the channel 82 and into an outlet passage 56 due to a pressure differential between the inlet passage 52 and the outlet passages 56.

The passage 78 can have any shape or size suitable for receiving filtrate through the filter media 80 and then delivering the filtrate to the passage 56. For example, the filter plates may include protrusions on its surface to space the filter media 80 from the surface of the filter plate 68 to create a space for fluid flow. Any other suitable arrangement can be used to achieve the desired passage 78.

Preferably, the filter media 80 is a permeable material that permits liquid to pass therethrough, while preventing solids having a certain size to pass therethrough. The filter media 80 can be, for example, a filter cloth, screen, paper, or any other suitable body for removing particulate from the slurry. In the illustrated embodiment, the filter media 80 preferably defines substantially the entire vertical wall of the chamber 70. Further, the filter media 80 defines a substantial portion of the pair of vertical walls of the chambers 70.

Figure 4:
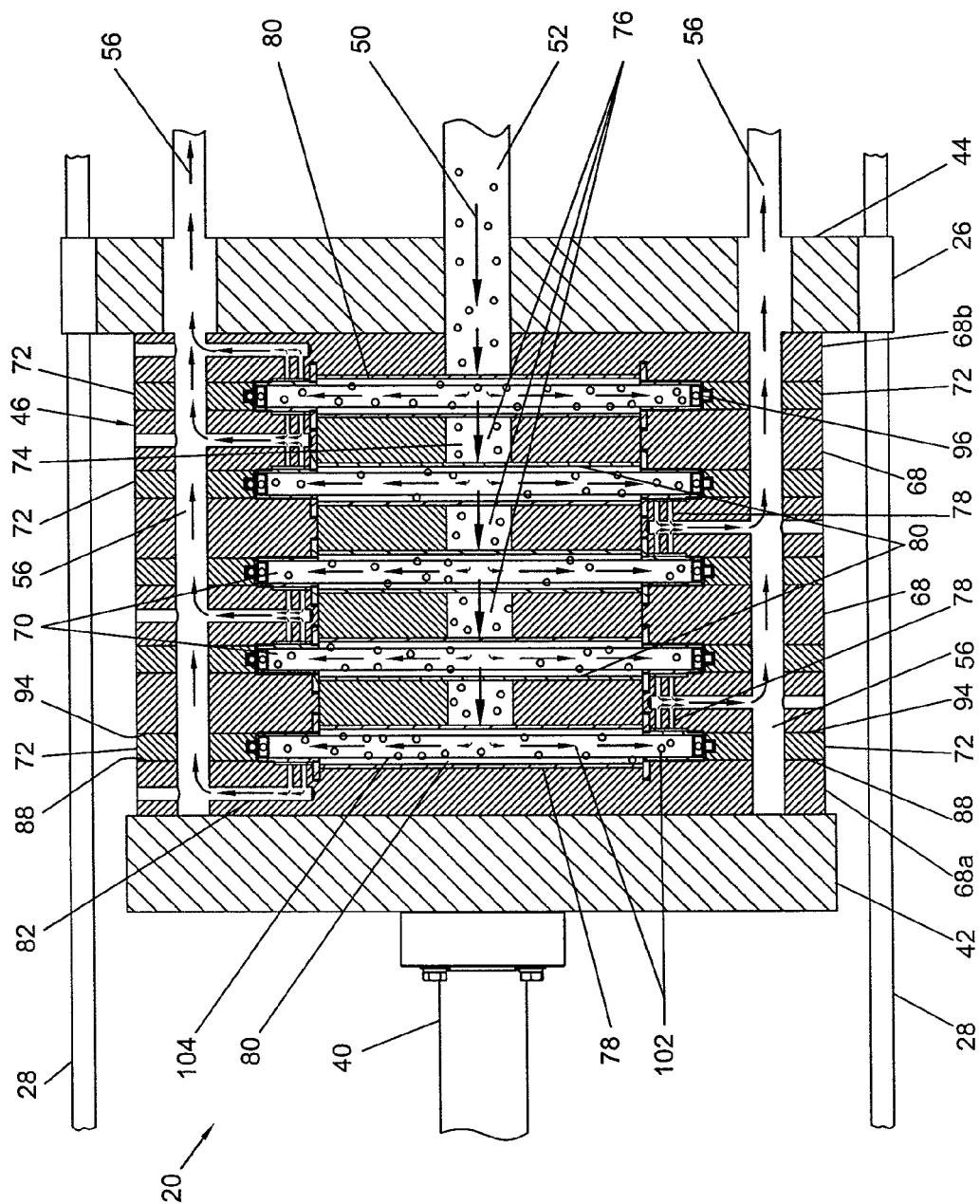
FIG. 4 is a cross-sectional view of modification of the filter press embodiment of FIG. 3. The filter press of FIG. 4 introduces a slurry to the individual filter cavities through a central feed channel, as opposed to the corner feed channels of the filter press of FIG. 3.
Figure 5A:
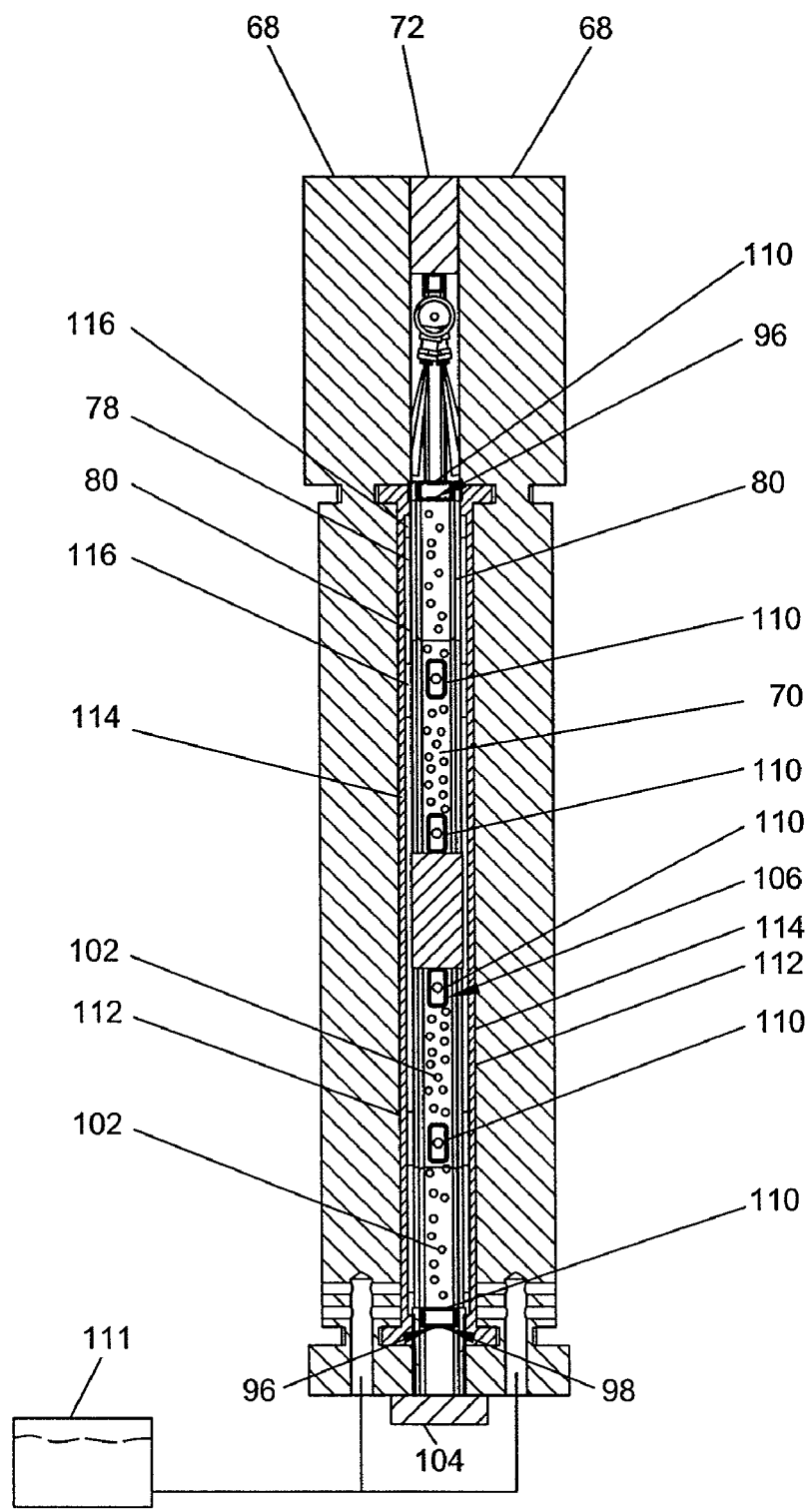
FIG. 5a is a vertical cross-sectional view of one filter plate assembly including a closure, which seals an open section of a perimeter of the filter cavity. Preferably, a scraper assembly is carried by the closure.
Figure 5B:
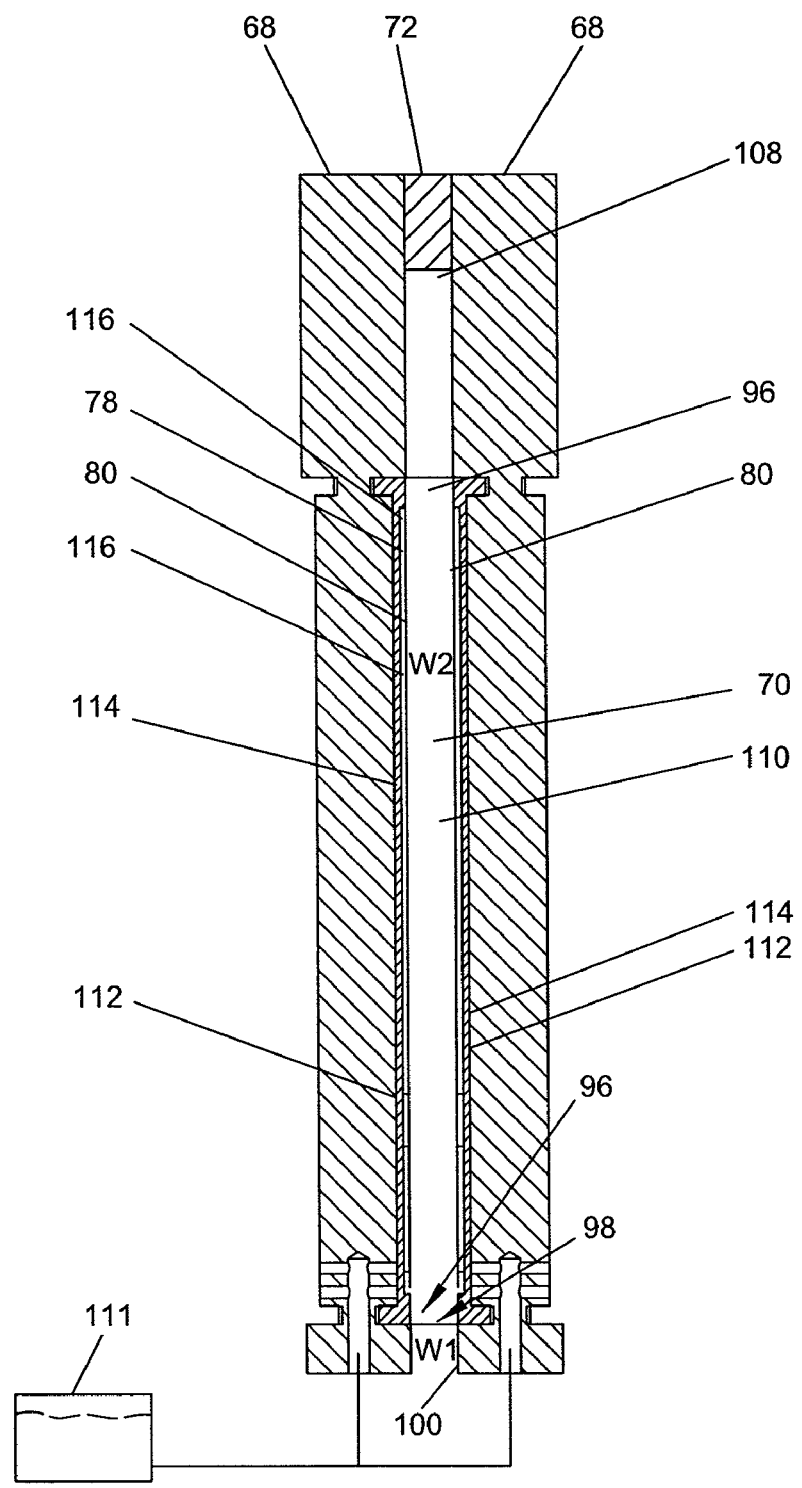
FIG. 5b is a vertical cross-sectional view of the filter plate assembly of FIG. 5a, with the closure and scraper assembly removed.

With reference to FIGS. 3 through 5b, preferably, a seal is formed between the filter plates 68 and interposed frames 72. With reference to FIG. 5b, at least a portion of a perimeter of the filter chamber 70 is open when the filter plates 68 and frames 72 are contacting one another, or are in a closed position. That is, the filter plates 68 and frames 72 do not contact one another along the open section of the perimeter of the filter chamber 70. A closed section of the perimeter is defined where the filter plates 68 and frames 72 contact one another and form a seal therebetween. The seals inhibit, and preferably prevent, slurry from exiting the fluid chambers 70 by flowing between the filter plates 68 and frames 72 at the sealed location when a sufficient squeezing, or closing force is applied to the collection of filter plates 24.

With reference to FIG. 3a, the frame 72 includes a surface 84 facing a surface 86 of the filter plate 68. When the frame 72 and the plate 68 are in a closed position, the surface 86 is pressed against the surface 84 to form a seal 88. Similarly, the intermediate filter plate 68 includes a surface 90 facing a surface 92 of the frame 72. When the frame 72 and the filter plate 68 are in the closed position, at least a portion of the surface 90 is pressed against at least a portion of the surface 92 to form a seal 94. In some arrangements, distinct sealing members may be used to assist in forming the seals 88, 94. For example, each of the seals 88, 94 can include a rubber member (e.g., a O-ring or a gasket) that is compressed between the filter plate 68 and a portion of the frame 72. However, those skilled in the art will recognize that there are other means that can be used for ensuring the integrity of the chamber 70.

As described above, preferably the filter plates 68 and the frame 72 cooperate to define a perimeter 96 of the chamber 70. In the illustrated arrangement, the perimeter of the chamber generally refers to the portions of the filter chambers 70 facing the longitudinal axis of the collection of filter plates 24. The seals 88, 94 provide a sealed section of the perimeter 96 such that fluid cannot escape from the filter chambers 70 of the collection of filter plates 24 as described above. Preferably, each of the filter chambers 70 are sealed in a similar manner. The sealed section defined by the seals 88, 94 preferably has a length that is less than the entire length of the perimeter 96 of the chamber 70 such that an open section 98 of the perimeter 96 is defined, as described above. As described above, in some arrangements, the frame 72 may be omitted and adjacent filter plates 68 may contact one another.

In the illustrated embodiment, the frame 72 does not entirely surround the filter chamber 70 and defines a substantial portion of the open section 98. The open section 98 communicates with an outlet 100, which permits particulate cake 102 to exit from between the filter plates 68 through the open section 98.

With reference to FIGS. 5a and 5b, a closure 104 is configured to close the open section of the perimeter 96 and create a seal with the frame 72 and/or the filter plates 68 to seal the filter chamber 70. Thus, with the closure 104 and the plurality of filter plates 24 in a closed position, as illustrated in FIG. 5a, the filter chamber 70 is sealed and a filtering cycle may be carried out. The closure 104 may take on many alternative shapes and sizes, depending on the shape and size of the open section 98 of the filter chamber 70. For example, in the illustrated arrangement, the closure 104 is in the shape of an elongated flange.

Once a filtering cycle has been completed, the closure 104 may be moved to an open position, as illustrated in FIG. 5b, to permit access to the filter chamber 70 through the open section 98. Preferably, the plurality of filter plates 24 remain in a closed position while the closure 104 is moved to the open position. In some instances, the hydraulic force unit 34 may be reduced in pressure such that the collection of filter plates 24 are no longer compressed sufficiently to seal the filter chambers 70. However, preferably, the collection of filter plates 24 are not separated to any significant extent and, more preferably, are not separated a distance greater than the width of the filter chamber 70. In some arrangements, however, it may be desirable to separate the filter plates 68 by a distance greater than the width of the filter chamber 70.

With reference to FIG. 5b, preferably the open section 98 is configured and sized for convenient removal of the cake 102 (FIG. 4a) from the chamber 70. In the illustrated arrangement, the width W1 (distance along a longitudinal axis of the filter plate assembly 24) of the open section 98 is approximately equal to the width W2 of the chamber 70. However, in alternative arrangements, the width W1 of the open section 98 may be less than or greater than the width W2 of the chamber 70. Thus, there are various suitable shapes and sizes of the open section 98 suitable to permit cake to be removed from the filter press 20, preferably without significant separation of the filter plates 68.

In the illustrated arrangement, the closure 104 carries a scraper assembly 106. The scraper assembly 106 is configured to assist in removal of the particulate cake 102 from the filter chamber 70. Preferably, the scraper assembly is carried by the closure 104 and, accordingly, moves through the filter chamber 70 along with movement of the closure 104. With reference to FIGS. 3a and 4b, the frame 72 defines a groove 108 configured to receive at least a portion of the scraper assembly 106. When the closure 104 is moved from its closed position at the end of a filter cycle, the scraper assembly 106 preferably moves through the filter chamber 70 and removes at least a portion of the particulate cake 102, which is discharged through the open section 98 of the perimeter 96 of the filter chamber 70.

The scraper assembly 106 preferably includes a surface that extends at least partially across the width of the filter chamber 70 to assist in removing the particulate cake 102. Preferably, the scraper assembly 106 includes multiple surfaces that assist in moving the particulate cake 102 toward the open section 98 of the perimeter 96 of the filter chamber 70. In addition, the scraper assembly 106 may include additional portions 110 that at least partially segment the filter chamber 70 to assist in breaking up the particulate cake 102 as the scraper assembly 106 is removed from the filter chamber 70.

In operation of the filter press 20, the collection of filter plates 24 are moved to the closed position to form the sealed filter chambers 70. The plates (e.g., the filter plates 68 and the frame 72) between the moveable head 42 and the stationary head 44 are squeezed together until the filter plates 68 contact the adjacent filter plate 68 or frame 72 to form the sealed filter chamber 70 for containing the pressurized slurry.

Figure 6:
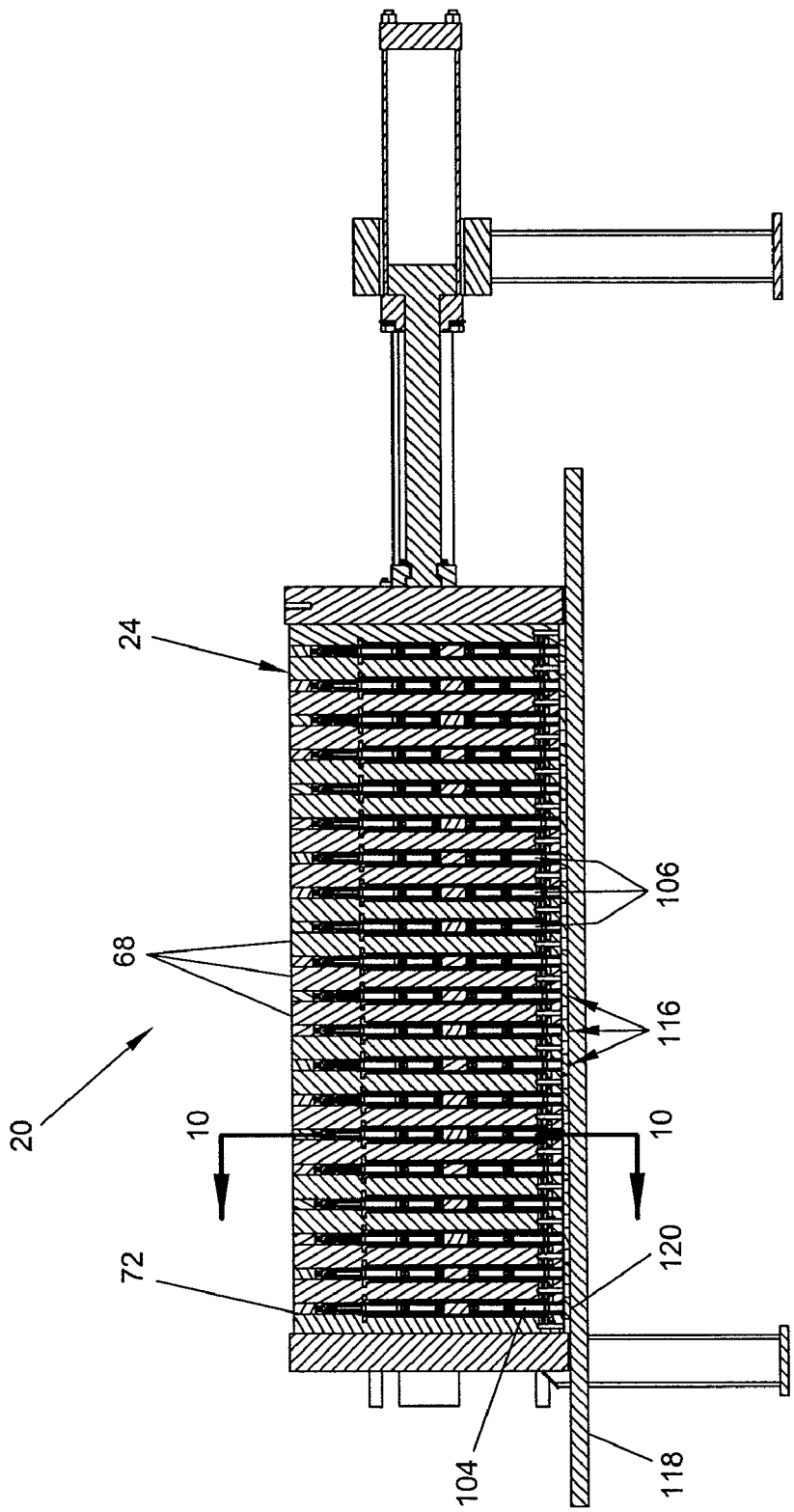
FIG. 6 is a cross-sectional view of the filter press of FIG. 1, illustrating the closures in a closed position.

The closure 104 is moved to a closed position to block the opening 100 and close the chamber 70, as shown in FIG. 6. When the closure 104 is in the closed position, fluid within the chamber 70 is inhibited from passing through the open section 98 and out of the opening 100.

During the filtering cycle, the slurry source 48 provides slurry that passes through the head stand 26 and into the collection of filter plates 24 in the direction indicated by the line 50 in FIG. 1. The passage 52 introduces slurry into the collection of filter plates 24 along the corner inlet passage 76, as shown in FIG. 3. As slurry passes through the filter chamber(s) 70, pressure within the chamber 70 causes the liquid component of the slurry to pass through the filter media 80 and into the passage 78 and then into the passage 56 and out of the collection of filter plates 24. The filter media 80 captures the solid component of the slurry within the chamber 70. The solids within the chamber 70 accumulate to form a particulate cake 102.

At the end of the filter cycle, at least a portion of any liquid remaining within particulate cake can be remove by, optionally, applying pressure to the cake during a squeeze or pressure cycle. With reference to FIGS. 4a and 4b, to apply pressure to remove moisture within the cake 102, a pump (e.g., a diaphragm squeeze pump 111) is configured to supply a pressurized fluid into a pair of passages 112 on either side of the cake 102. In the illustrated arrangement, each passage 112 is defined by the surface of the filter plates 68 and a flexible membrane 114, which is interposed between the filter plates 68 and the filter media 80, as will be appreciated by one of skill in the art. The pressurized fluid within the passages 112 squeezes the cake between the opposing membranes 114.

When the membranes 114 apply pressure to the cake 102, liquid is forced from the cake 102 through the media filter 80 and into the passage 78. Protrusions 116 defined by the membranes 114 provide a space between membrane 114 and filter media 80 to form the passage 78 for passing the liquid component of the slurry into the outlet passage 56 (FIG. 3). The squeeze cycle preferably forms a dense cake 102 to facilitate removal of the cake by the scraper assembly 106. For example, the squeeze cycle preferably reduces the force required to move the closure 104, and scraper assembly 106, from the closed position to the open position. In one arrangement, each filter chamber 70 includes only one flexible membrane 114 that is preferably configured to squeeze the filter cake 102 from only one side. Thus, the total number of cake squeeze arrangements may be reduced thereby reducing manufacturing costs. Such an arrangement is often referred to as a "mixed pack."

If desired, a purge cycle can be utilized to further dry the cake 102. In one embodiment, a gas (e.g., air) can be passed into and out of the chamber 70. Moisture in the cake 102 is removed as the gas is blown though and along the cake 102. The temperature of the gas may be ambient, room temperature, or may be heated. Furthermore, a vacuum may be applied to the filter chambers 70 to assist in drying the filter cake 102. In another arrangement, the scraper assemblies 106, or any other suitable component of the collection of filter plates 24 or filter press 20, may be configured to vibrate to assist in breaking up the particulate cake 102. A vibrator motor (not shown) may be used to impart vibrations to the scraper assemblies 106 or other component. Other methods apparent to one of skill in the art to further dry and/or break up the particulate cake 102 may be used alone or in any suitable combination.

FIG. 4 illustrates a modification of the filter press 20 of FIG. 1. The filter press 20 of FIG. 4 preferably is substantially similar to the filter press of FIG. 1 and, thus, like reference numerals are used to indicate like components. One difference between the filter press 20 of FIG. 1 and the filter press 20 of FIG. 4 is that the filter press 20 of FIG. 4 positions the inlet passage 52 generally in the center of the collection of filter plates 24, as will be appreciated by one of skill in the art. In most other respects, the filter press 20 of FIG. 4 is substantially similar to the filter press 20 of FIG. 1 and, thus, is not described in further detail.

Returning to the filter press 20 of FIG. 1, with reference to FIGS. 5-12, the filter press 20 preferably also includes a closure actuator, or closure rail 118, that is connected to the plurality of the elongated members, or flanges 120, of the closures 104. The closure rail 118 may be used to provide generally uniform movement of the closures 104 relative to the collection of filter plates 24 and to move several or all of the closures 104 simultaneously. The closure 104 preferably is moved vertically to move the closures 104 (and scraper assemblies 106, if provided) out of the filter plate assemblies 46. In an alternative arrangement, the closures 104 can be independently moved relative to the frames 72 depending on the application. In addition, the rail 118 can be coupled to a force generator, such as a hydraulic force unit, that is configured to move the closures 104 between an open and closed position.

Figure 7:
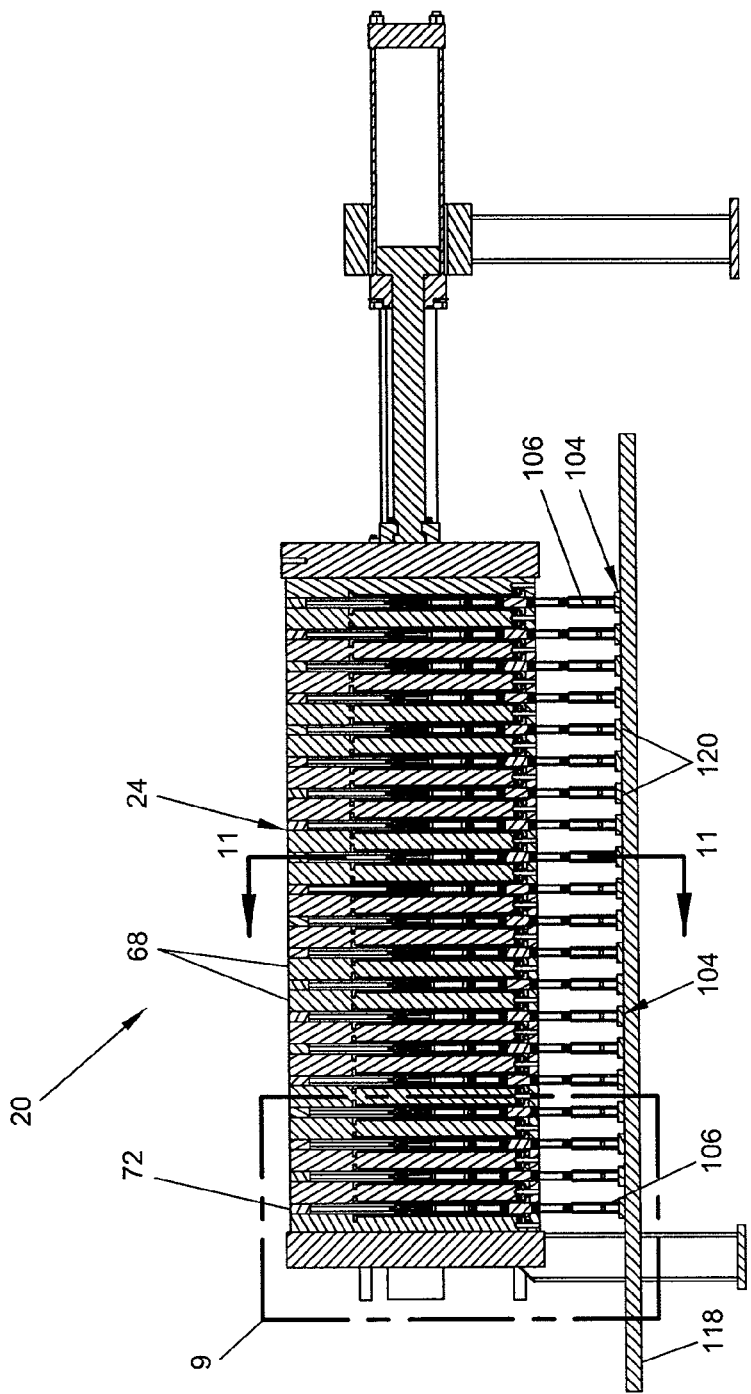
FIG. 7 is a cross-sectional view of the filter press of FIG. 1, illustrating the closures in a partially open position.

With reference to FIG. 7, the closures 104 and scraper assemblies 106 are illustrated in a partially opened position to permit access to the filter chambers 70. The illustrated position can be achieved by moving the closure rail 118 downwardly relative to the collection of filter plates 24.

Figure 8:
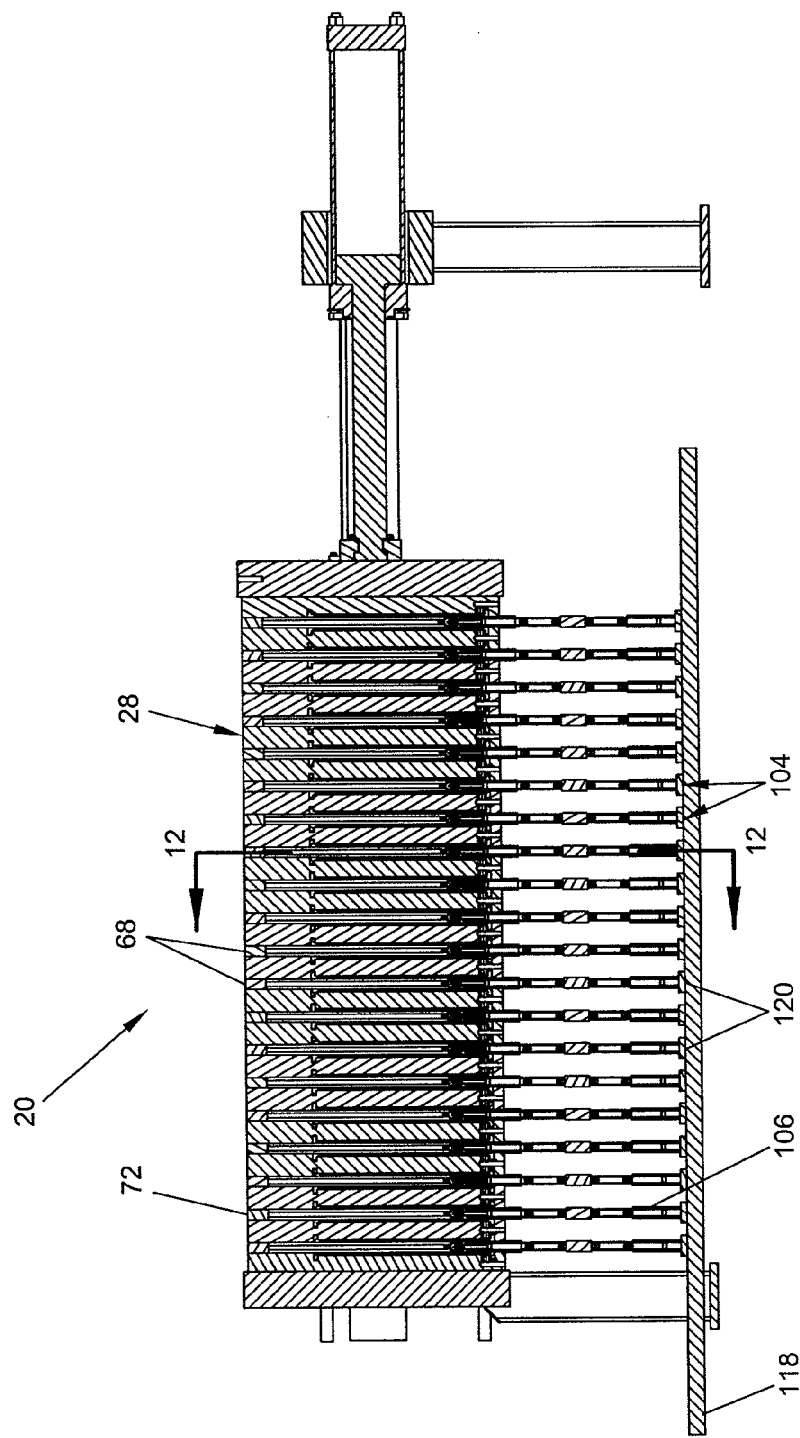
FIG. 8 is a cross-sectional view of the filter press of FIG. 1, illustrating the closures in an open position.

With reference to FIG. 8, the closures 104 are positioned so that the upper end portion of the scraper assemblies 106 are located near the bottom portions of the filter chambers 70. Thus, preferably, in an open position, a substantial portion of the scraper assemblies 106 extend from a lower end of the frames 72.

Figure 13:
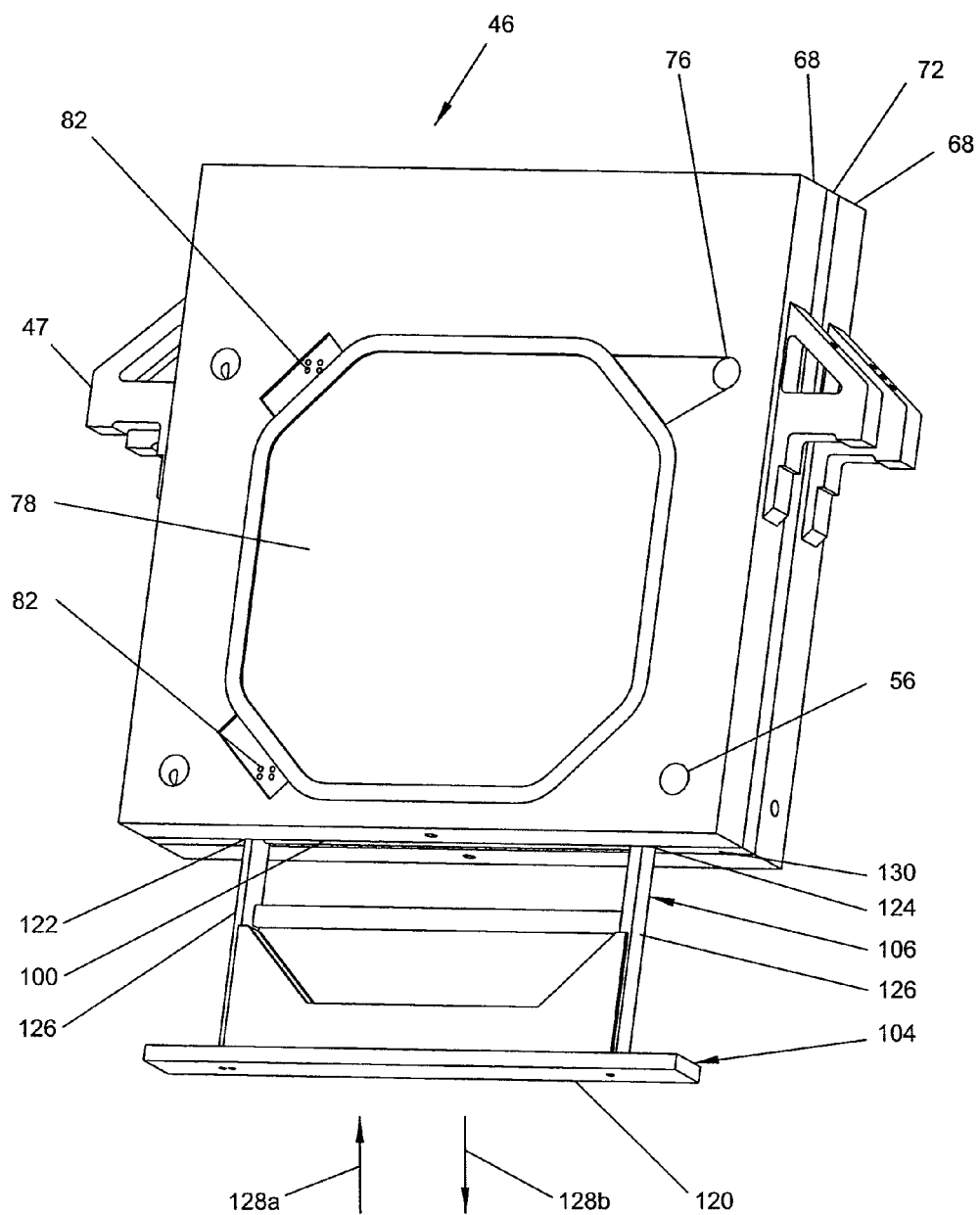
FIG. 13 is a perspective view of a filter plate assembly removed from the filter press and illustrating the closure and scraper assembly in a partially open position. The filter plate assembly includes a pair of filter plates separated by a frame.

With reference to FIG. 13, a filter plate assembly 46 is shown separate from the filter press 20. In the illustrated arrangement, a pair of filter plates 68 are disposed on either side of the frame 72 to create the filter plate assembly 46, as described above. The closure 104 is illustrated in a position partially extending from the opening 100 of the frame 72. Preferably, the opening 100 is configured to receive a portion of the closure 104. In one embodiment, the opening 100 has ends 122, 124 that are configured to receive and engage the sides 126 of the scraper assembly 106. From the illustrated position, the closure 104 is moved to the closed position by advancing the closure 104 into the frame 72 in the direction of the arrow 128*a* by sliding the sides 126 along the ends 122, 124. The closure 104 is advanced until the flange 120 contacts the lower portion or surface 130 of the frame 72.

After the closure 104 reaches the closed position (shown in FIG. 6), such that the flange 120 forms a seal with the frame 72 and/or the filter plates 68, slurry may pass into the chambers 70 and the slurry is inhibited from escaping through the opening 100. As the closure 104 moves from the closed position in the direction of the arrow 128*b*, at least a portion of the cake disposed in the chamber 70 can be removed through the opening 100, preferably assisted by the scraper assembly 106. The cake can be removed from the chamber 70 while the filter plate assembly 46 is in a closed position and, preferably, while maintaining the seals between the filter plates 68 and the frame 72. As described above, in some arrangements, sealing pressure may be released from the plurality of filter plates 24, however, preferably the filter plates 68 are not separated from one another by a distance that is greater than a width of the filter chamber 70.

Figure 15:
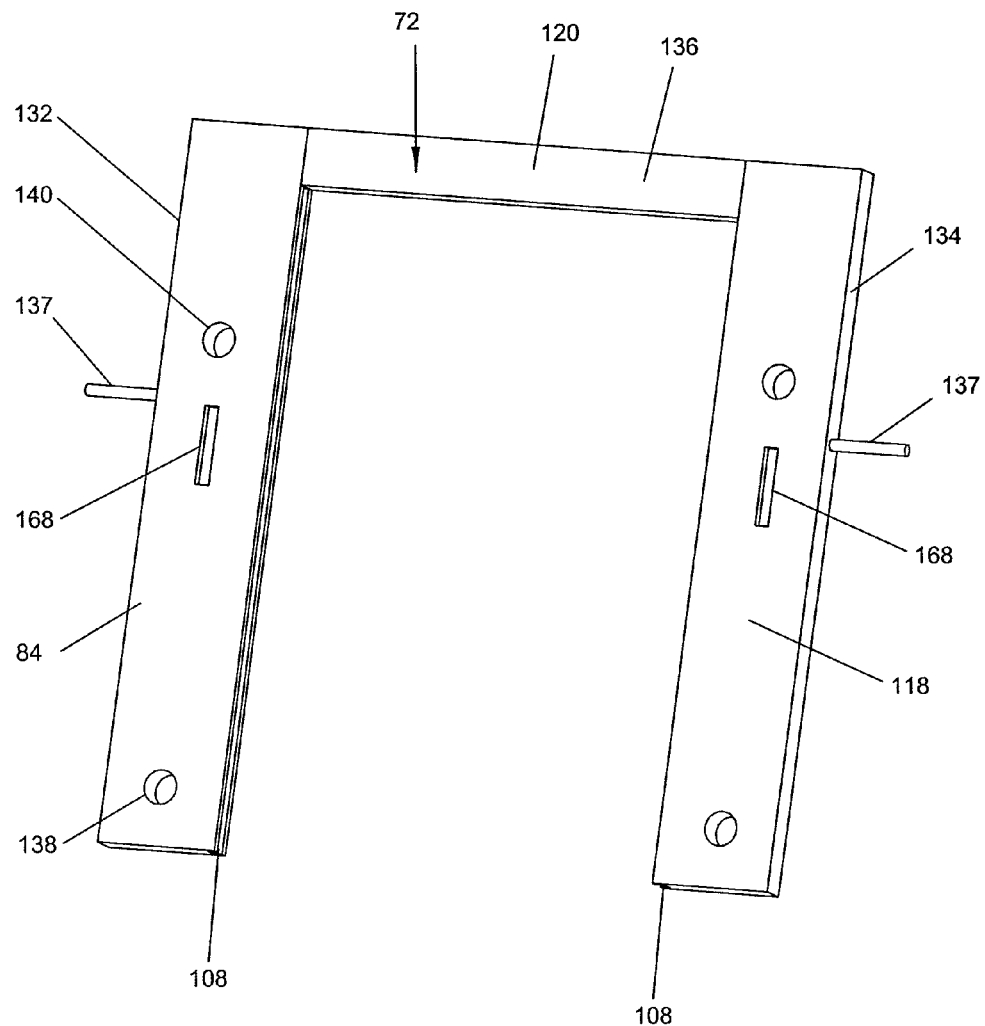
FIG. 15 is a perspective view of the frame of the filter plate assembly of FIG. 13.

With reference to FIG. 15, the frame 72 can be configured to receive and hold the closure 104 and/or scraper assembly 106. In the illustrated embodiment, the frame 72 includes three sections creating a generally U-shaped assembly. The frame 72 preferably includes a pair of generally rectangular sections 132, 134 and a section 136 disposed between and connecting one end of the sections 132, 134. In the illustrated arrangement, the sections 132, 134, and 136 cooperate to form three sides of the perimeter 96 of the filter chamber 70, as described above with reference to FIGS. 5*a* and 5*b*. However, the frame 72 can have other configurations to define filter chambers 70 having other shapes.

Preferably, the frame 72 defines a groove, or slot 108, on each vertical side facing the filter chamber 70, which is configured to receive one side of the scraper assembly 106. In addition, the section 136 defines a portion of the slot 108 such that the slot 108 is a generally U-shaped groove or channel that receives at least a portion of the scraper assembly 106. Thus, one side of the scraper assembly 106 is slidably engaged with one side of the slot 108, the other side of the scraper assembly 106 is slidably engaged with the other side of the slot 108, and the upper end of the scraper assembly 106 is engaged with the upper portion of the slot 108.

The sections 132, 134 of the frame 72 preferably also includes a handle or other protruding structure 137 that is configured to function as a handle. The frame 132 also includes a pair of holes 138, 140 that define a portion of the inlet and outlet passages 52, 56, respectively.

Figure 9:
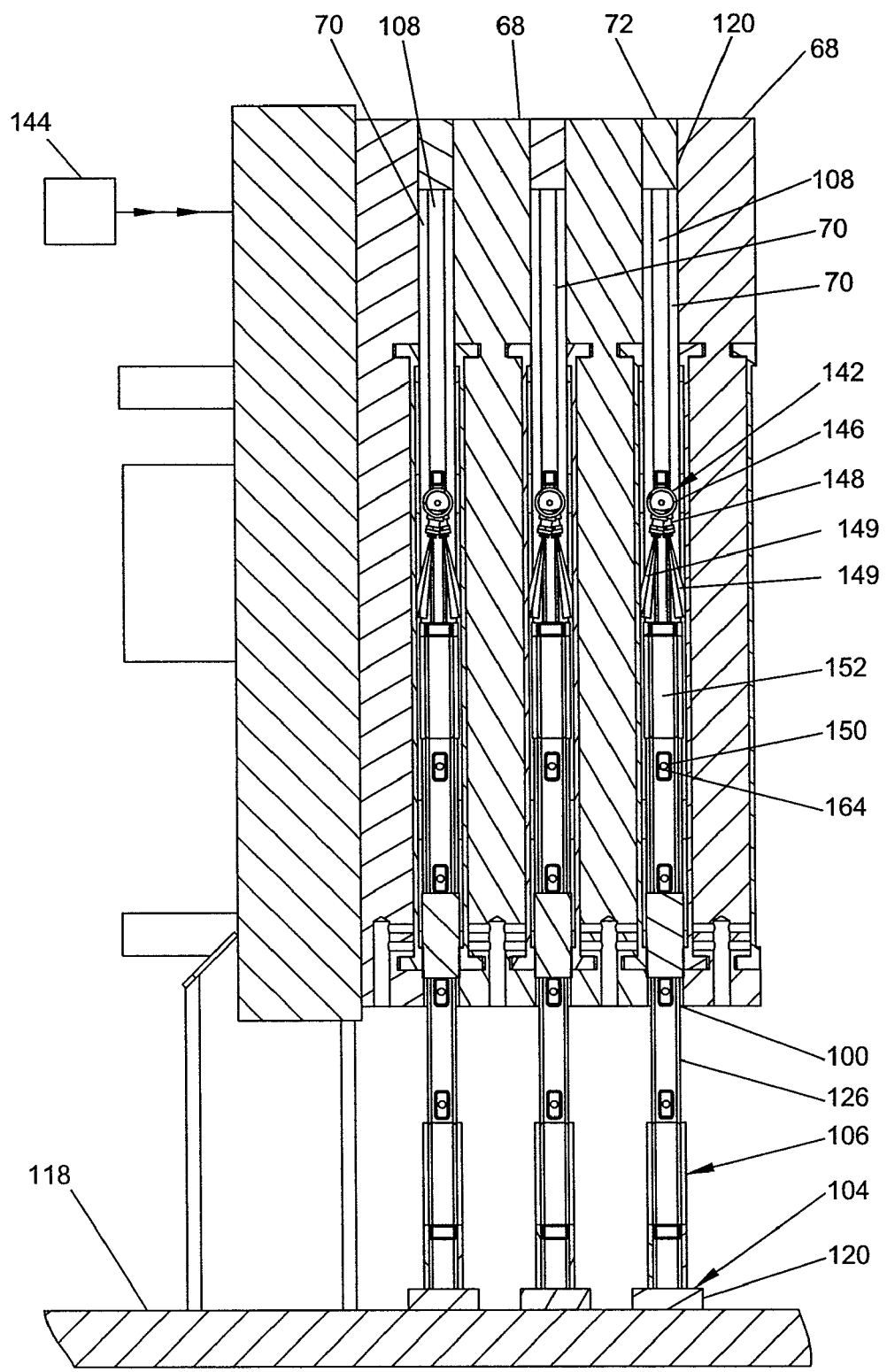
FIG. 9 is an enlarged, partial view of the filter press of FIG. 7.
Figure 16:
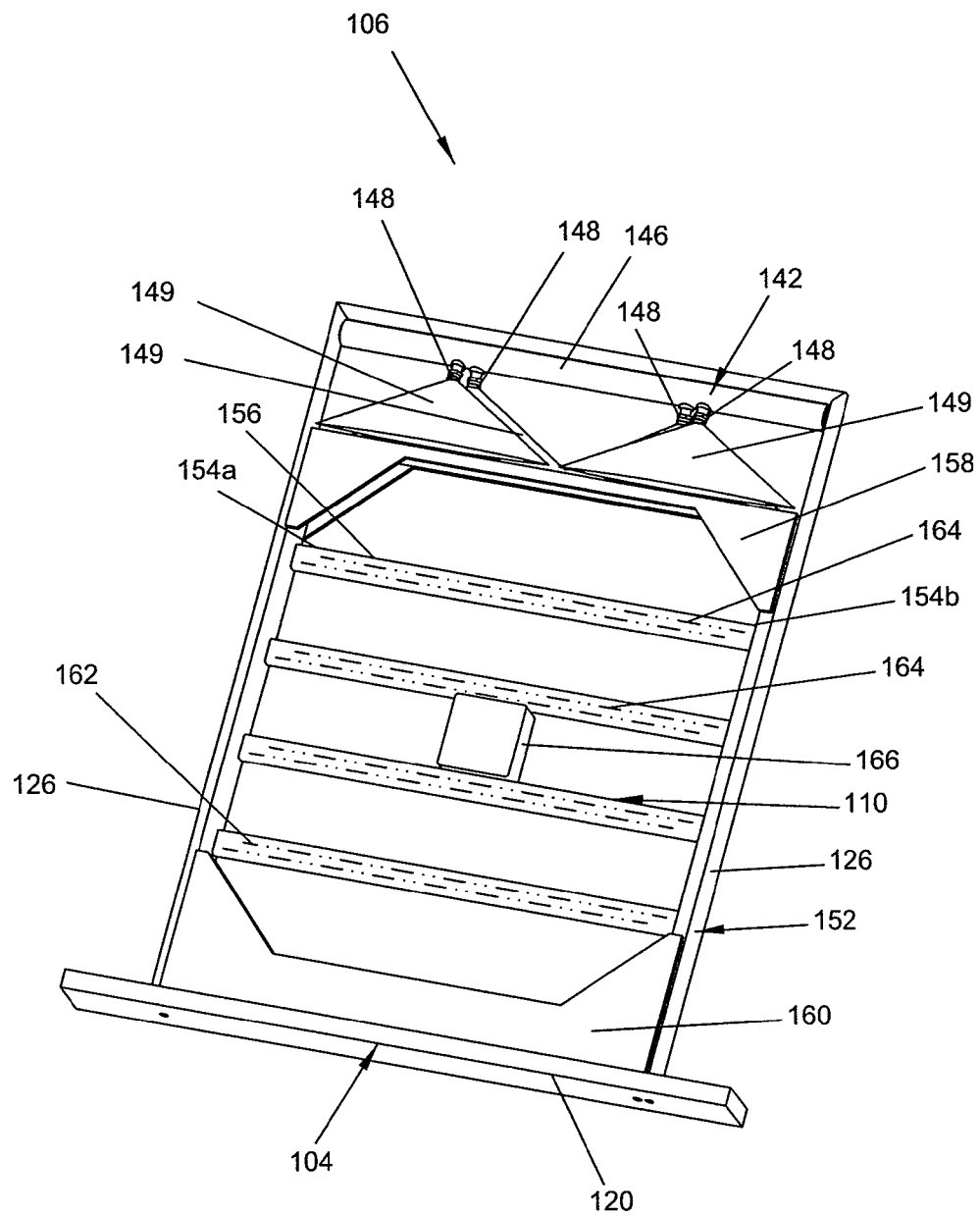
FIG. 16 is a perspective view of the closure and scraper assembly of the filter plate assembly of FIG. 13.

With reference to FIGS. 9 and 16, the scraper assembly 106 preferably supports a sprayer assembly 142, which is configured to spray a wash fluid toward the filter media 80. Preferably, the sprayer assembly 142 is disposed at the upper portion of the scraper assembly 106 and is movable along with the scraper assembly 106 and closure 104 for cleaning the filter media 80 of the filter chamber 70. In the illustrated embodiment, the sprayer assembly 142 includes a washer fluid source 144, a feed manifold 146, and at least one nozzle or sprayer 148.

The washer fluid source 144 (FIG. 9) is configured to provide a wash fluid to the feed manifold 146. Wash fluid may travel from the fluid source 144 to the feed manifold 146 through any suitable fluid passage. However, preferably, a portion of the fluid passage is defined within the scraper assembly 106. The washer fluid source 144 can deliver any fluid suitable for being sprayed out of the sprayer assembly 142 and washing the chambers 70. In the illustrated embodiment, the washer fluid source 144 provides liquid in the form of water, with or without detergents. In one embodiment, the washing liquid can be temperature controlled for effective and rapid removal of solids from the filter media 80. For example, the fluid source 144 can deliver heated water to the sprayers 148 at a high pressure so that the sprayer 148 can produce high pressure spray 149 that rapidly cleans the filter media 80. Those skilled in the art will recognize that the fluid source 144 can provide any fluid (e.g., air, water, liquid chemicals) that can be used to clean the collection of filter plates 24.

The sprayer 148 is configured and adapted to direct washer spray against at least a portion of the filter media 80. In the illustrated embodiment, the sprayer 148 delivers fluid from the washer fluid source 144 to the filter media 80 along at least a portion of the chambers 70 to dislodge and remove particulate disposed within the chamber 70. For example, at least one sprayer 148 can direct a spray of wash fluid 149 towards at least a portion of the surface of the filter media 80.

Preferably, the sprayer assembly 142 has more than one and, in the illustrated arrangement, four sprayers 148, a pair of which are arranged to spray one side of the filter chamber 70 while the other pair are arranged to spray the other side of the filter chamber 70. As the closure 104 is moved relative to the frame 72, the sprayers 148 preferably direct the washer fluid spray 149 towards the filter media 80 to dislodge and remove particulate matter remaining after the particulate cake has been discharged.

With reference to FIG. 16, the scraper assembly 106 preferably includes a pair of sides 126 that extend from the upper portion of a body 152 of the scraper assembly 106 to the lower portion of the body 152 and are connected to at least one scraper member 110. The inner portion of the body 152 defines at least a portion of the chamber 70, preferably at least a portion of the perimeter 96 of the chamber 70.

The scraper member 110 includes opposing ends 154a, 154b and an elongated portion 156 therebetween. The ends 154a, 154b of the scraper members 110 are coupled to the sides 126 of the scraper assembly 106. Preferably, the scraper members 110 are disposed between the sprayer assembly 142 and the flange 120 and generally parallel to each other. When the closure 104 is in the closed position, the scraper members 110 preferably extend substantially completely across the filter chamber 70, perpendicular to the longitudinal axis of the filter plate assembly 46.

In the illustrated embodiment, the elongated body 156 of each scraper member 110 is generally horizontally oriented and is generally rectangular in shape. However, the scraper member 110 can have other suitable shapes for causing movement of the cake 102. For example, but without limitation, the scraper member 110 may have a generally circular, elliptical, or polygonal cross section. Furthermore, as will be appreciated, although the scraper members 110 are generally horizontally oriented in the illustrated embodiment, in other arrangements the scraper members 110 may have other orientations. For example, the scraper members 110 may be vertically oriented, such as when the scraper assembly 106 is configured for movement in a horizontal direction. Thus, in some preferred arrangements, the scraper members 110 are oriented substantially normal to the direction of movement of the scraper assembly 106.

The scraper assembly 106 can have any suitable number of scraper members 110 configured to remove solids from the filter chamber 70. In one embodiment, the scraper assembly 104 has one scraper member 110. In another embodiment, the scraper assembly 104 has a plurality of scraper members 110. In the illustrated embodiment, the scraper assembly 104 has four scraper members 110. Each of the scraper members 110 can have a shape similar to the other scraper members 110. However, alternatively, the scraper members 110 can have shapes different than the other scraper members 110. Furthermore, the scraper members 110 can be disposed in different positions along the sides 126. In the illustrated embodiment, the scraper members 110 are generally evenly spaced between an upper portion 158 of the body 152 and a lower portion 160 of the body 152. However, the scraper members 110 can be unevenly spaced between the portions 158, 160 for the desired scraping and thermal characteristics, as described herein.

Preferably, the scraper members 110 are configured to engage and segment at least a portion of particulate cake that forms in the filter chambers 70 of the collection of filter plates 24. As illustrated in FIG. 5a, for example, the cake 102 surrounds at least a portion of the scraper members 110 after an amount of solid component of the slurry has been captured by the collection of filter plates 24. When the closure 104 is moved relative the filter plates, outer surfaces 162 of the scraper members 110 engage the particulate cake 102 to break it up and urge the cake 102 downwardly through the opening 100 and out of the collection of filter plates 24. Thus, preferably, the scraper members 110 have sufficient structural characteristics to assist in breaking apart the particulate cake 102. In the illustrated arrangement of FIGS. 5-16, the scraper members 110 extend substantially entirely across the filter chamber 70. In some arrangements, the scraper members 110 may even contact the filter media 80.

In one arrangement, the scraper member 110 is configured to circulate a heating fluid, from a heating fluid source (not shown), in thermal communication with the particulate cake within the filter chambers 70 to assist in drying the particulate cake. As illustrated in FIG. 16, preferably at least a portion of the scraper members 110 define an internal passage or channel 164 for carrying a heating fluid (such as steam or hydraulic fluid, for example) to thermally communicate with the cake 102 within the chambers 70. The channel 164 has a longitudinal axis that is generally aligned with the longitudinal axis of the scraper member 110 and, preferably, the channels 164 of the individual scraper members 110 communicate with one another to circulate the heating fluid throughout the filter chamber 70 to drying, or reduction of moisture, of the particulate cake 102.

With reference to FIG. 16, preferably, the scraper assembly 106 carries at least one stay boss 166. Alternatively, if no scraper assembly 106 is provided, the stay boss can be carried by the closure 104. As will be appreciated by one of skill in the art, the stay boss 166 is configured to support the filter plates 68 to resist deformation of the filter plates 68 along the longitudinal axis of the collection of filter plates 24 during a filter cycle. In the illustrated embodiment, a single stay boss 166 is provided which is a generally solid plate connected to a pair of scraper members 110 near the central region of the scraper assembly 106. When the scraper assembly 106 is within the chamber 70, the stay boss 166 is interposed between the walls of the chamber 70 and is configured to prevent substantial displacement of at least a portion of the walls of the chamber 70. Furthermore, the stay boss 166 can provide structural support to the scraper members 110. Although not illustrated, a plurality of stay bosses 166 can be coupled to the closure 104.

The stay boss 166 may take on various shapes depending on desired structural characteristics and configuration of the chamber 70. For example, the stay boss 166 may be generally square, rectangular, circular or elliptical and can be attached to one or more members, such as the scraper members 110. The stay boss 166 can also define a surface that is configured to dislodge cake formed within the chamber 70 as the scraper assembly is moved between the closed and open position.

Preferably, the stay boss 166 extends substantially across the axial width of the filter chamber 70. That is, the dimension of the filter chamber 70 along the longitudinal axis of the filter press 20. More preferably, the stay boss 166 contacts the filter media of each filter plate 68 when the filter plates are in a closed position. Preferably, a stay boss 166 is provided if the filter chamber 70 has a height or width dimension (in a plane generally perpendicular to the longitudinal axis of the filter press 20) of more than about 20 inches. However, one or more stay bosses may be provided for filter chambers 70 having a dimension less than 20 inches, if desired. Those skilled in the art can determine the suitable size, configuration, and orientation of the stay boss 166 depending on the desired interaction between the boss 166 and the filter plates 68.

Although not illustrated, the closure 104 and the scraper assembly 106 can be separate components that can be independently operated. In one embodiment, for example, the closure 104 preferably includes the flange 120 for closing the opening 100. The scraper assembly 106, if provided, is preferably disposed within the filter chamber 70 of the collection of filter plates 24. The closure 104 may be removed after the filtering cycle so that the scraper assembly 106 can be employed to remove cake 102. In some arrangements, a scraper assembly 106 may not be necessary or desired and, thus, may not be provided.

Figure 14:
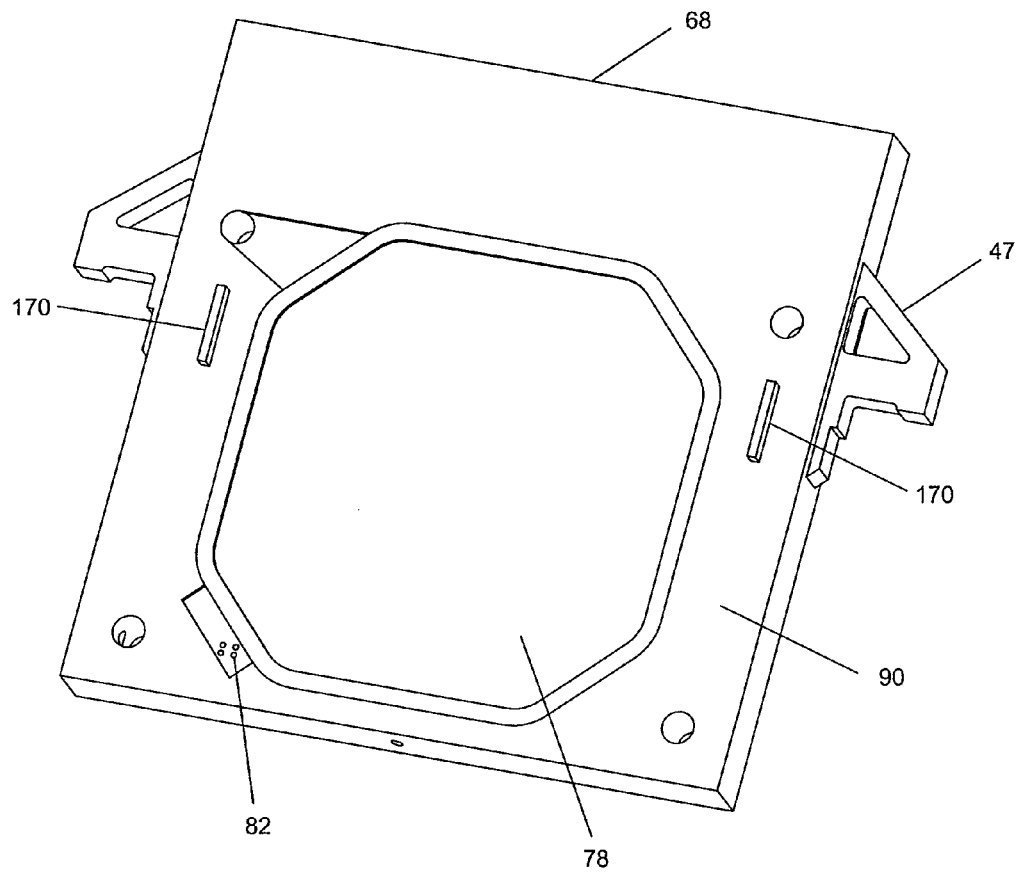
FIG. 14 is a perspective view of one filter plate of the filter plate assembly of FIG. 13.

With reference to FIGS. 14 and 15, preferably the frames 72 and the filter plates 68 are keyed together to reduce or eliminate relative movement between the particulate filter plates 68 and the frame 72 when slurry is pressurized within the filter chambers 70. Preferably, the frame 72 is keyed to at least one filter plate 68 to inhibit expansion of the frame 72, in a radial direction, in response to fluid pressure within the chamber 70. In the illustrated embodiment of FIGS. 14 and 15, the frame 72 has a key recess 168 that is configured to receive a protrusion or key 170 on the plate 68. Preferably, the frame 72 has a pair of key recesses 168 on each of the section 132, 134 that are adapted to mate with a pair of corresponding keys 170 of the plates 68. Additionally, both sides of the frame 72 preferably have key recesses 168 such that plates 68 on both sides of the frame 72 are keyed to the frame 72.

Although not illustrated, the key recess 168 can be a hole, or other structure that is configured to receive a structure on the plate 68. Alternatively, the frame 72 can have a key or protrusion that is configured to be received within a key recess of the plate 68. In another embodiment, the frame 72 and the plate 68 can have ridges or grooves that are configured to engage each other to prevent relative movement between them. In addition, a separate key member may be provided to engage recesses in both the plates 68 and frame 72. Furthermore, other methods for inhibiting radial expansion of the frame 72 may also be utilized, such as internal or external bracing within the frame 72, for example, but without limitation. In one arrangement, the side rails 28 may be configured to contact the sides of the frame 72 to inhibit radial expansion. In such an arrangement, the rails 28 may be sized to contact a substantial portion of the length of the frame 72 or even the entire length of the frame 72.

Figure 10:
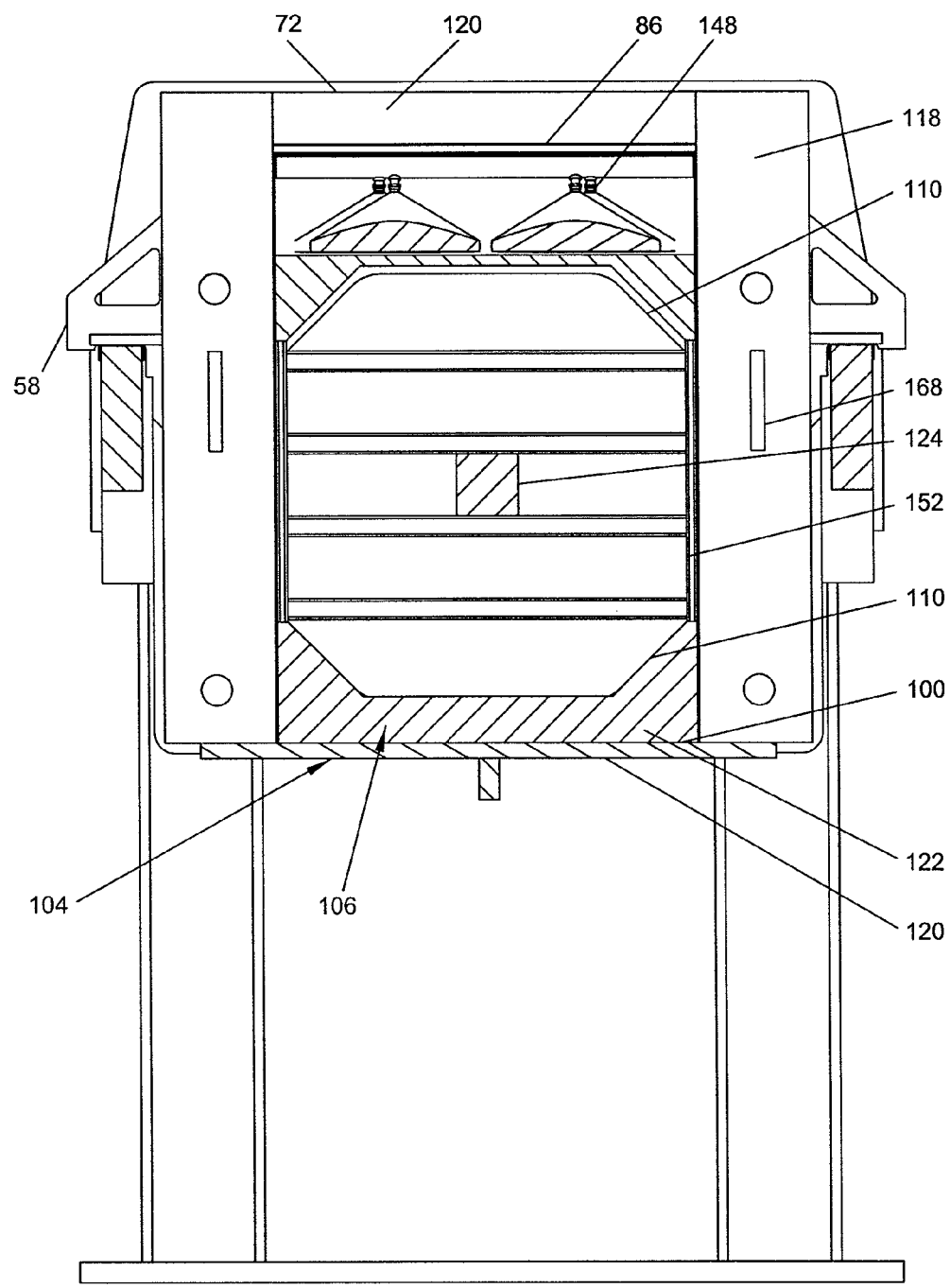
FIG. 10 is a transverse cross-sectional view of the filter press of FIG. 6, with the closure in a closed position.
Figure 11:
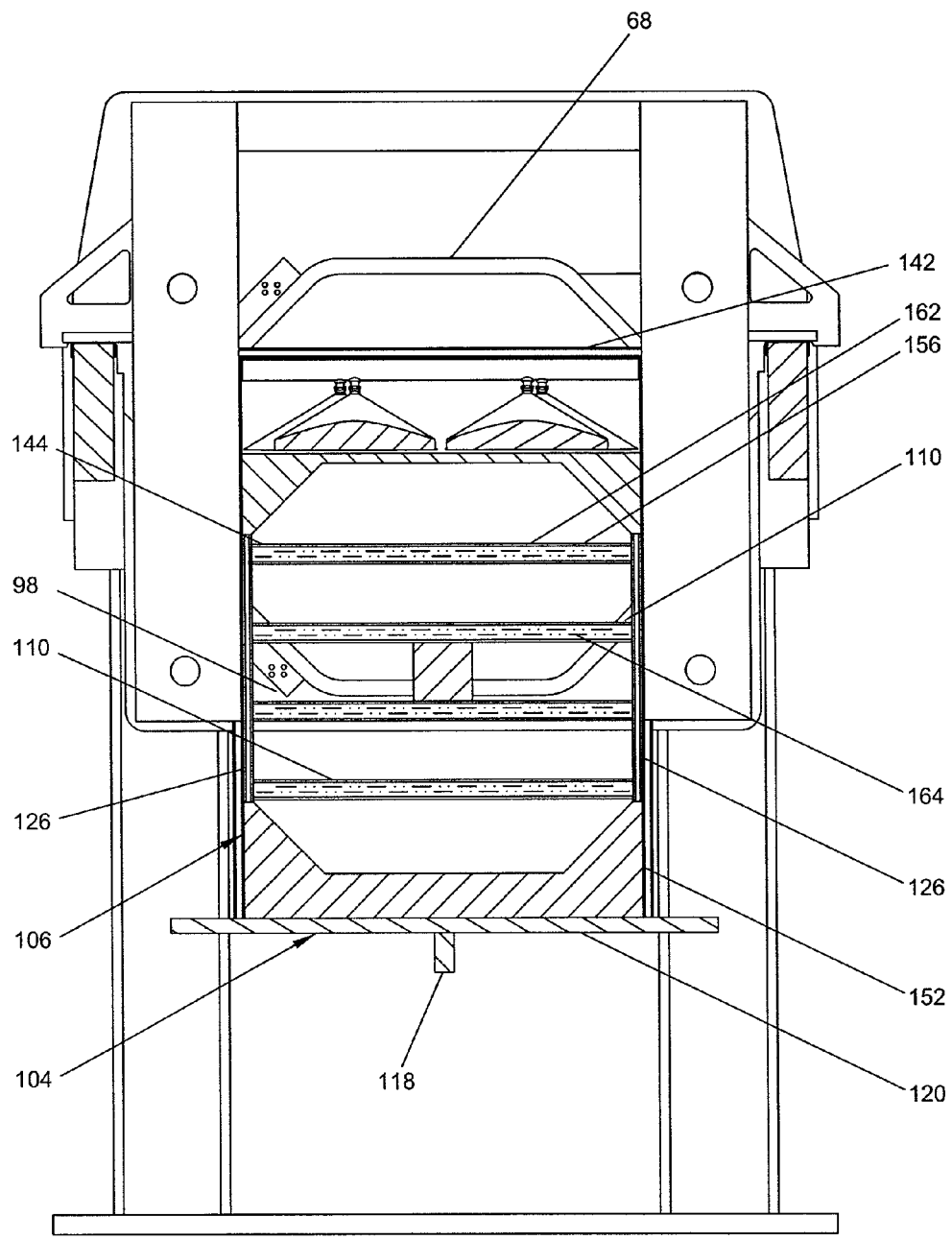
FIG. 11 is a transverse cross-sectional view of the filter press of FIG. 7, with the closure in a partially open position.
Figure 12:
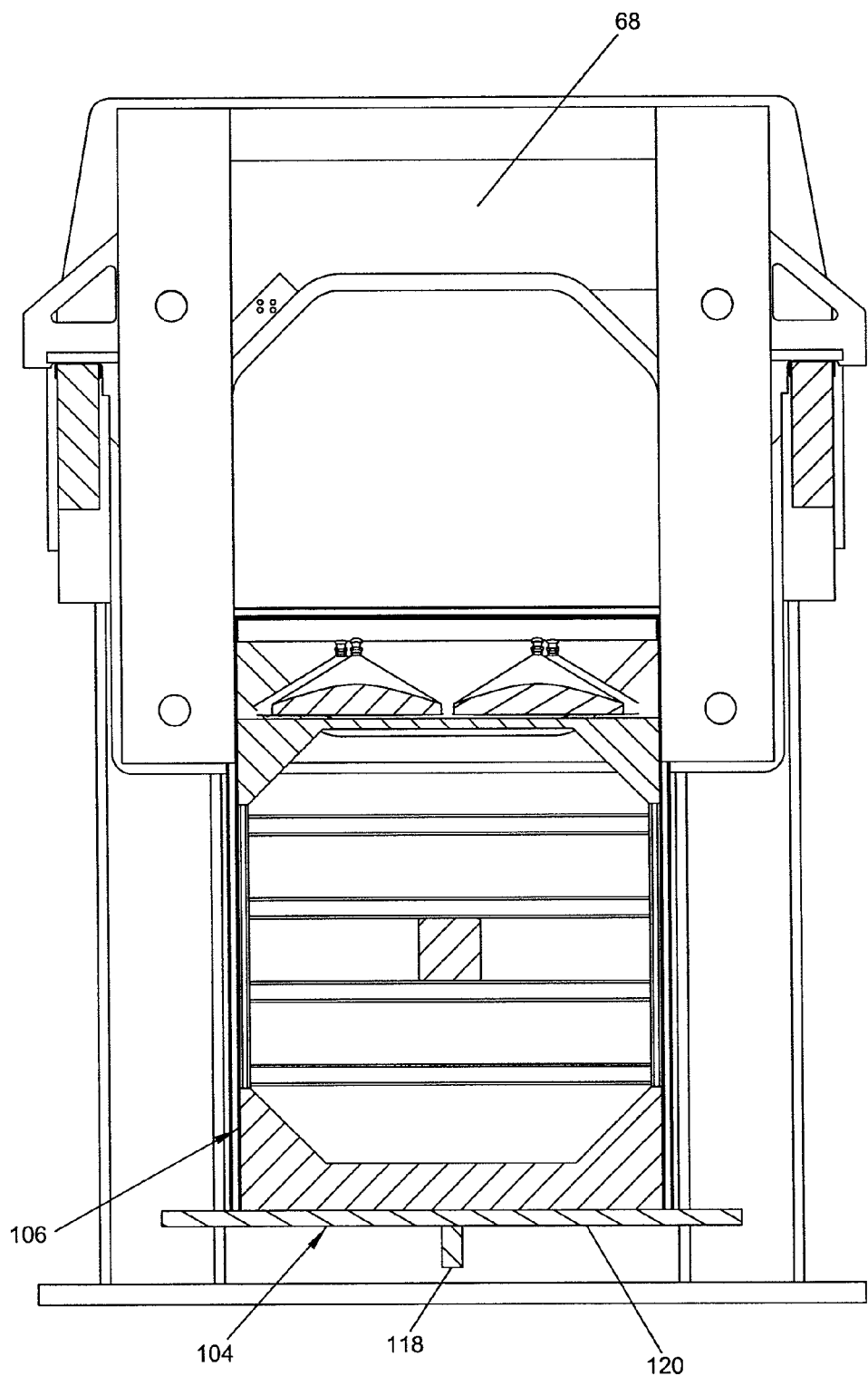
FIG. 12 is a transverse cross-sectional view of the filter press of FIG. 8, with the closure in an open position.

With respect to FIG. 10, the closure 104 is illustrated in the closed position. Preferably, as described above, the closure 104 forms a seal with the frame 72 and/or plates 68 to prevent fluid from escaping from the filter chamber 70 during operation. Preferably, the seals formed between the closure 104 and the frame 72 and/or plates 68 substantially prevent slurry from passing from the filter chambers 70.

As described above, the particulate cake 102 may be heated to assist in drying the cake 102. Heated fluid is preferably passed through the channels 164 of the scraper assembly 106 so that heat from the fluid within the channel 164 is conducted to the cake 102, and thus heats the cake. Preferably, the channel 164 is sized such that a sufficient amount of fluid can be passed through the scraper member 110 to effectively warm the cake within the collection of filter plates 24. The heating of the cake 102 can be used in combination with the squeeze cycle to ensure that the cake 102 is sufficiently dry for convenient removal and collection.

As described above, a purge cycle may be utilized to further dry the cake 102. In one embodiment, a gas (e.g., air) is passed into and out of the chamber 70. Moisture in the cake 102 is removed as the gas is blown through and along the cake 102.

The closure 104 can be moved from the closed position to an open position to move the scraper assembly 106 and assist in removing the particulate cake 102 from the filter chamber 70. The closure 104 can be moved from the closed position by downwardly moving the closure 104 relative to the adjacent filter plates 68 and out of the opening 100. This movement urges the cake within the chambers 70 out of the opening 100. The speed that the closure 104 is moved from the closed position to the open position may be determined by the characteristics of the cake 102.

Preferably, the filter plates 68 remain in, or close to, a closed position contacting the frame 72 as the closure 104 is moved to the open position. Thus, the collection of filter plates 24 can be held between the heads 42, 44 such that the filter plates 68 (and frames 72) are in a relatively compressed position relative to one another while the closure 104 is moved from the closed position to the open position. Further, several closures 104 can be moved simultaneously from the closed position to the open position by moving the rail 118. Thus, the chambers 70 can be emptied of solids without separating the filter plates 68 and the frames 72 from one another.

Alternatively, the piston rod 40 can be retracted to reduce the compressive force on the collection of filter plates 24. After the reduction of pressure on the collection of filter plates 24, the closure 104 may be moved from the closed position to the open position to discharge the cake. The reduced pressure can facilitate convenient removal of the closure 104 and removal of the cake 102. In another arrangement, the filter plates 68 and frames 72 may be separated a small distance to further reduce the force necessary to discharge the particulate cake 102. However, preferably, the plates 68 are not separated a distance greater than the width W1 of the filter chamber 70 or particulate cake 102.

While slurry is being filtered within the collection of filter plates 24 during the filtering cycle, the closure 104 preferably is in the closed position and the sprayer assembly 142 is off so that substantially no fluid is sprayed from the sprayers 148. At the end of the filter cycle, the closure 104 is moved from the closed position by moving the closure 104 relative to the adjacent filter plates 68 and out of the opening 100. This movement assists the cake 102 within the chambers 70 in being discharged from the opening 100, as described above. Preferably, the closures 104 are then moved to a closed position and the sprayers 148 are activated to direct a spray of wash fluid toward the filter media 80, while the closure 104 is pulled out of the opening 100 to wash substantially the entire length of the filter media 80 from the top to the bottom of the filter chamber 70.

Figure 17:
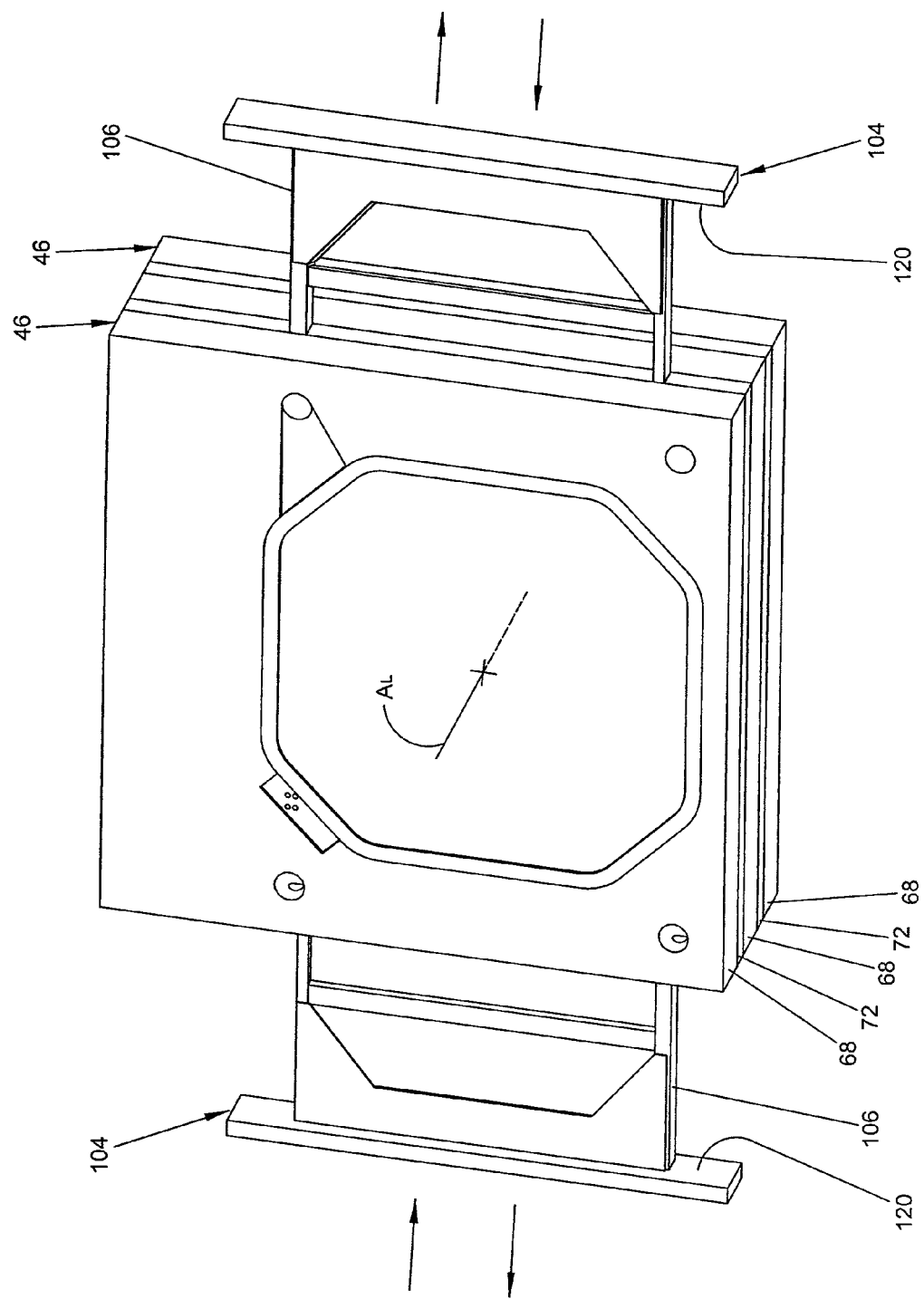
FIG. 17 is a perspective view of a modification of the filter plate assembly of FIG. 13, wherein the scraper assemblies of two adjacent filter plate assemblies are removed from opposing sides of the filter plate assemblies.

FIG. 17 illustrates a modification of the filter plate assembly 46 of FIG. 13. The filter plate assembly 46 of FIG. 17 is substantially similar to the filter plate assembly 46 of FIG. 13 and, therefore, like reference numerals are used to denote like components. FIG. 17 illustrates a pair of individual filter plate assemblies 46, including two frames 72 and three filter plates 68. As described above, the first filter plate assembly 46 includes the forward-most plate 68, the forward-most frame 72 and the intermediate plate 68. The second filter plate assembly includes the rearward-most plate 68, the rearward-most frame 72 and the intermediate plate 68. Thus, the intermediate plate 68 forms a portion of each illustrated filter plate assembly 46. Furthermore, the forward-most and rearward-most plates 68 may form a portion of filter plate assemblies (not shown) that are adjacent the illustrated filter plate assemblies 46.

The filter plate assemblies 46 of FIG. 17 are substantially similar to any of the filter plate assemblies 46 described in relation to FIGS. 1-16. However, in the assemblies 46 of FIG. 17, the closures 104 and scraper assemblies 106 of the forward-most filter plate assembly 46 and the rearward-most filter plate assembly 46 open from different sides of the filter plate assemblies 46. That is, the closures 104 and scraper assemblies 106 extend from the filter plate assemblies 46 in different radial directions from one another relative to a longitudinal axis $A_L$ of the assemblies 46. Preferably, the closures 104 and scraper assemblies 106 extend from opposing sides of the filter plate assemblies 46 and, more preferably, from opposing vertical sides of the filter plate assemblies 46. The closures 104 and scraper assemblies 106 may be moved by separate closure mechanisms or by the same closure mechanism. Such an arrangement provides additional space between adjacent closures 104 and scraper assemblies 106 to permit the particulate cake to be easily discharged without interference from the particulate cake of adjacent filter cavities.

With reference to FIGS. 18a and 18b, a modification of the filter press 20 of FIG. 1 is illustrated. Preferably, the filter press 20 of FIGS. 18a and 18b is substantially similar to the filter press 20 of FIG. 1 and, therefore, like reference numerals are used to denote like components. However, in the filter press 20 of FIGS. 18a and 18b, the longitudinal axis of the collection of filter plates 24 is oriented in a generally vertical direction. Accordingly, with such an arrangement, less floor space is used compared with the filter press 20 of FIG. 1.

The filter press 20 preferably is supported by a frame assembly 150, which accommodates the hydraulic cylinder 34. The hydraulic cylinder 34 is configured to selectively apply or remove a squeezing force to the collection of filter plates 24. The hydraulic cylinder 34 may also be configured to retract to permit the individual filter plates 68 (and frames 70, if provided) to separate from one another. Preferably, a linking structure 152, such as a cable or chain, for example, interconnects the adjacent filter plates 68 (or a frame 70 and a filter plate 68) such that when the hydraulic cylinder 34 is withdrawn, the filter plates 68 (and frames 70, if provided) are held in a spaced relationship by the linking structures.

Preferably, the filter press 20 of FIGS. 18a and 18b include closures 104 and scraper assemblies 106 which, desirably, are similar to those described with reference to the filter press 20 of FIG. 1. In the filter press 20 of FIGS. 18a and 18b, adjacent closures 104 and scraper assemblies 106 are removed from different sides, and preferably opposing sides, of the collection of filter plates 24 to permit the particulate cake to be discharged without interference from the particulate cake of adjacent filter cavities. Preferably, the filter press 20 comprises a drive mechanism 154 that is configured to move the closure rail 118 and closures 104. Desirably, the drive mechanism 154 comprises a linkage arrangement configured to convert linear movement in a direction generally parallel to the longitudinal axis of the filter press 20 into linear movement of the closure rail 118 in a direction generally perpendicular to the longitudinal axis of the filter press 20. However, other suitable arrangements to move the closure rail 118 and/or closures 104 may also be used.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A filter plate assembly, comprising:
   a first filter plate having a first surface;
   a second filter plate having a second surface facing said first surface, said first and second filter plates movable between an open position and a closed position relative one another, wherein in said closed position an interior portion of said first surface is spaced from an interior portion of said second surface to define therebetween a filter chamber having a perimeter;
   wherein said filter plate assembly is capable of creating a seal between said first filter plate and said second filter plate, thereby defining a sealed section of said perimeter, said sealed section extending a length less than an entire length of said perimeter such that said filter plate assembly also defines an open section of said perimeter, said open section being sized and shaped to occupy a substantial entirety of a side of said perimeter such that an entirety of the particulate cake can be removed from said filter chamber; and
   a closure configured to be movable in a linear direction between a first position closing said open section and a second position not closing said open section, said closure further being capable of sealing said open section of said perimeter in said first position.

2. The filter plate assembly of claim 1, additionally comprising a frame between said first filter plate and said second filter plate, said frame defining at least a portion of said open section of said perimeter.

3. The filter plate assembly of claim 2, wherein said perimeter has four sides, said frame bounding three sides of said perimeter.

4. The filter plate assembly of claim 2, wherein said frame is keyed to at least one of said first filter plate and said second filter plate to inhibit expansion of said frame in response to pressure within said filter chamber.

5. The filter plate assembly of claim 1, wherein said closure carries a scraper, said scraper having a scraper surface extending between said first surface and said second surface and configured to urge particulate cake within said filter chamber toward said open section when said closure is moved toward said second position.

6. The filter plate assembly of claim 5, wherein said scraper surface extends substantially completely across said filter chamber from said first surface to said second surface.

7. The filter plate assembly of claim 5, wherein said scraper comprises multiple scraper surfaces spaced from one another which segment particulate cake within said filter chamber.

8. The filter plate assembly of claim 5, wherein said scraper comprises an internal fluid passage configured to bring a fluid into thermal communication with particulate cake within said filter chamber.

9. The filter plate assembly of claim 5, wherein said closure carries at least one spray nozzle, said spray nozzle connected to a wash fluid source and being configured to direct a spray of wash fluid toward at least one of said first surface and said second surface.

10. The filter plate assembly of claim 1, wherein said closure comprises a portion extending into said filter chamber, said portion supporting at least one stay boss extending substantially across said filter chamber from said first surface to said second surface.

11. The filter plate assembly of claim 1, wherein said perimeter includes an outer perimeter and a length of said outer perimeter equals a length of said sealed section plus a length of said open section.

12. A method of filtering, comprising:
forming a sealed filter chamber with a filter plate assembly comprising a first filter plate, a second filter plate, and a closure, said first filter plate and said second filter plate being movable from an open position to a closed position relative to one another and a closing force applied to said first and second filter plates to partially close said filter chamber, thereby defining an open section of said filter chamber, said closure being configured to close said open section of said sealed filter chamber;
introducing a slurry into said filter chamber;
forcing a liquid component of said slurry through a filter media lining a least a portion of said filter chamber until a particulate cake is formed within said filter chamber, said particulate cake occupying a substantial portion of said filter chamber;
reducing said closing force and maintaining said first filter plate and said second filter plate in said closed position;
removing said closure in a linear direction; and
discharging said particulate cake through said open section of said filter chamber.

13. The method of claim 12, additionally comprising positioning a frame between said first filter plate and said second filter plate, said frame at least partially defining said open section.

14. The method of claim 13, additionally comprising keying said frame to at least one of said first filter plate and said second filter plate to inhibit expansion of said frame in response to pressure within said filter chamber.

15. The method of claim 12, wherein said discharging of said particulate cake is facilitated by a scraper, which is movable through said filter chamber along with movement of said closure away from said open section.

16. The method of claim 12, additionally comprising providing a scraper within said filter chamber during a filter cycle, said scraper configured to segment said particulate cake.

17. The method of claim 12, additionally comprising providing a scraper within said filter chamber during a filter cycle, drying said particulate cake within said filter chamber by circulating a heated fluid within an internal fluid passage of said scraper.

18. The method of claim 12, additionally comprising directing a spray of wash fluid toward said filter media after said discharging of said particulate cake through said open section of said filter chamber and while maintaining said first filter plate and said second filter plate in said closed position.

19. The method of claim 12, additionally comprising resisting deformation of said first filter plate and said second filter plate in response to pressure external of said filter chamber by positioning at least one stay boss within said filter chamber during a filter cycle, said stay boss being carried by said closure.

* * * * *